May 31, 1960 R. W. WAMPLER ET AL 2,938,494
APPARATUS FOR SOLDER COATING
Filed Nov. 1, 1952 15 Sheets-Sheet 2
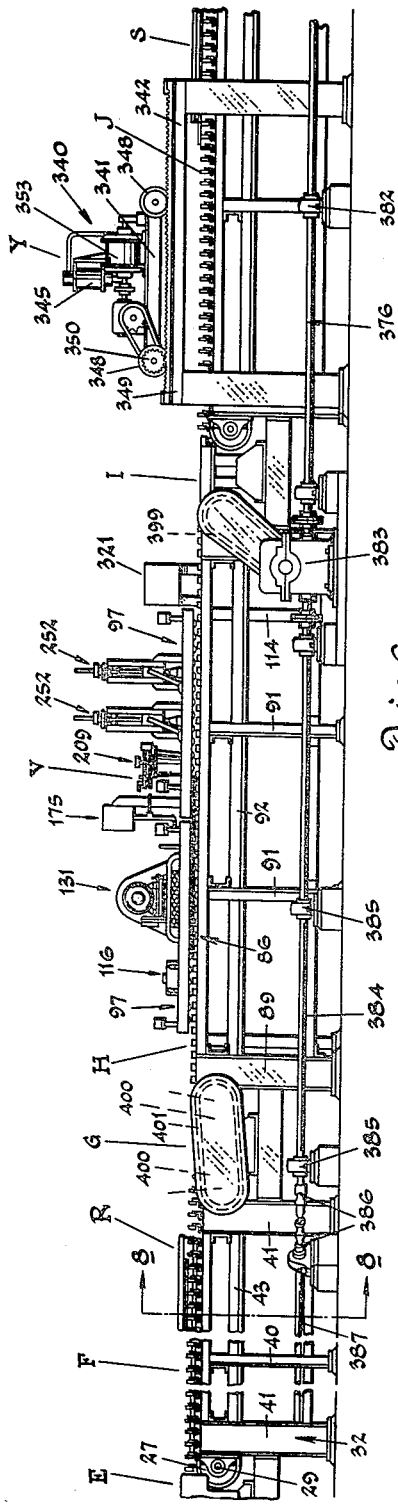
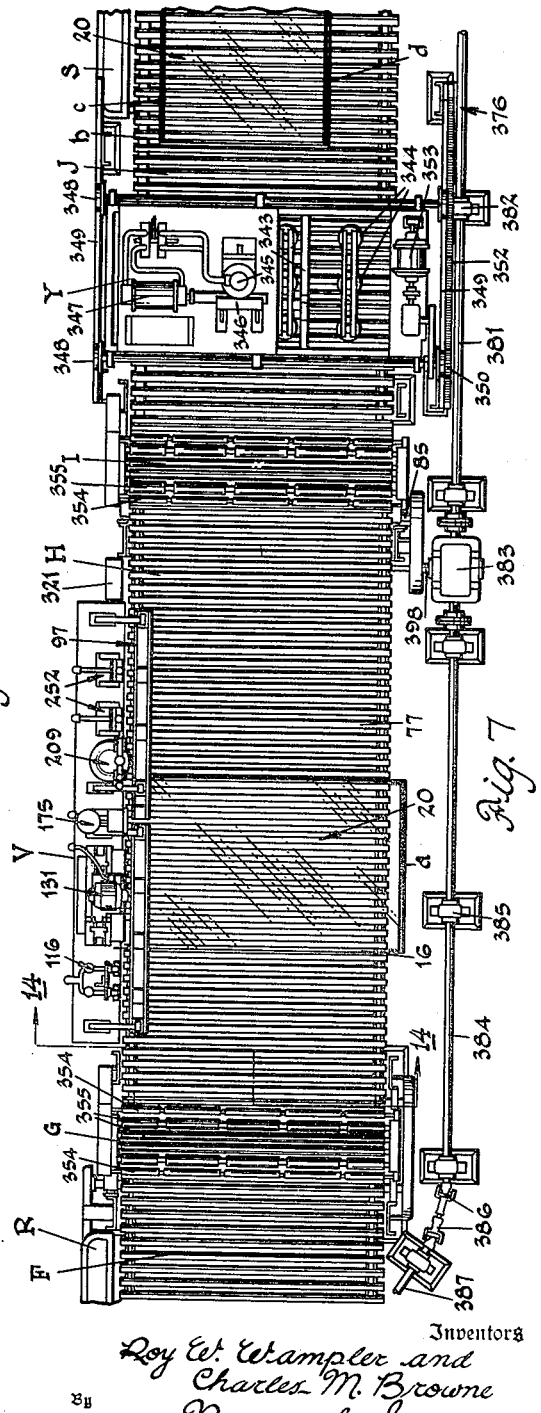
Inventors
Roy W. Wampler and
Charles M. Browne
By Nobbe & Swope
Attorneys May 31, 1960 R. W. WAMPLER ET AL 2,938,494
APPARATUS FOR SOLDER COATING
Filed Nov. 1, 1952 15 Sheets-Sheet 3
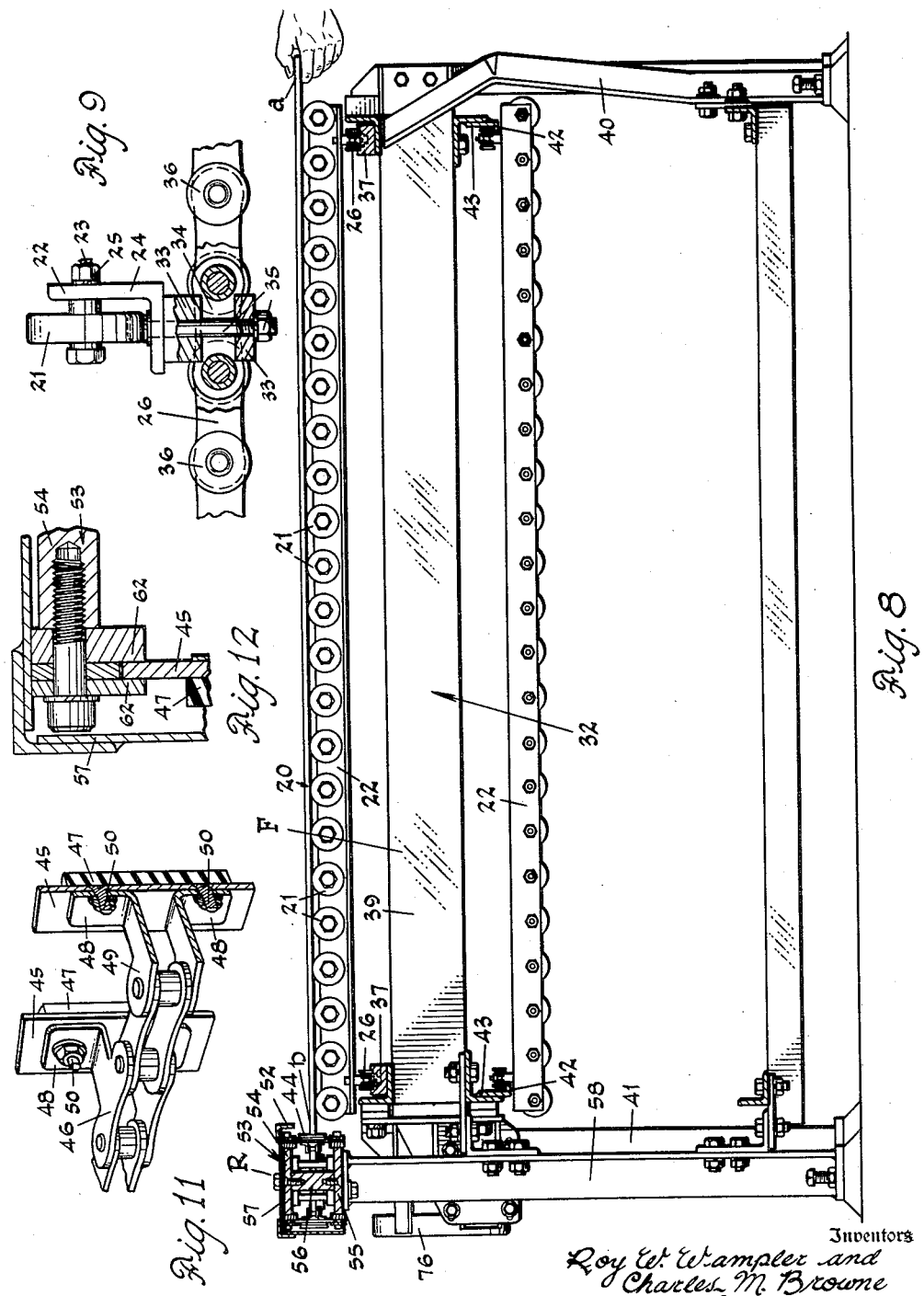
Inventors
Roy W. Wampler and
Charles M. Browne
By Nobbe & Swope
Attorneys

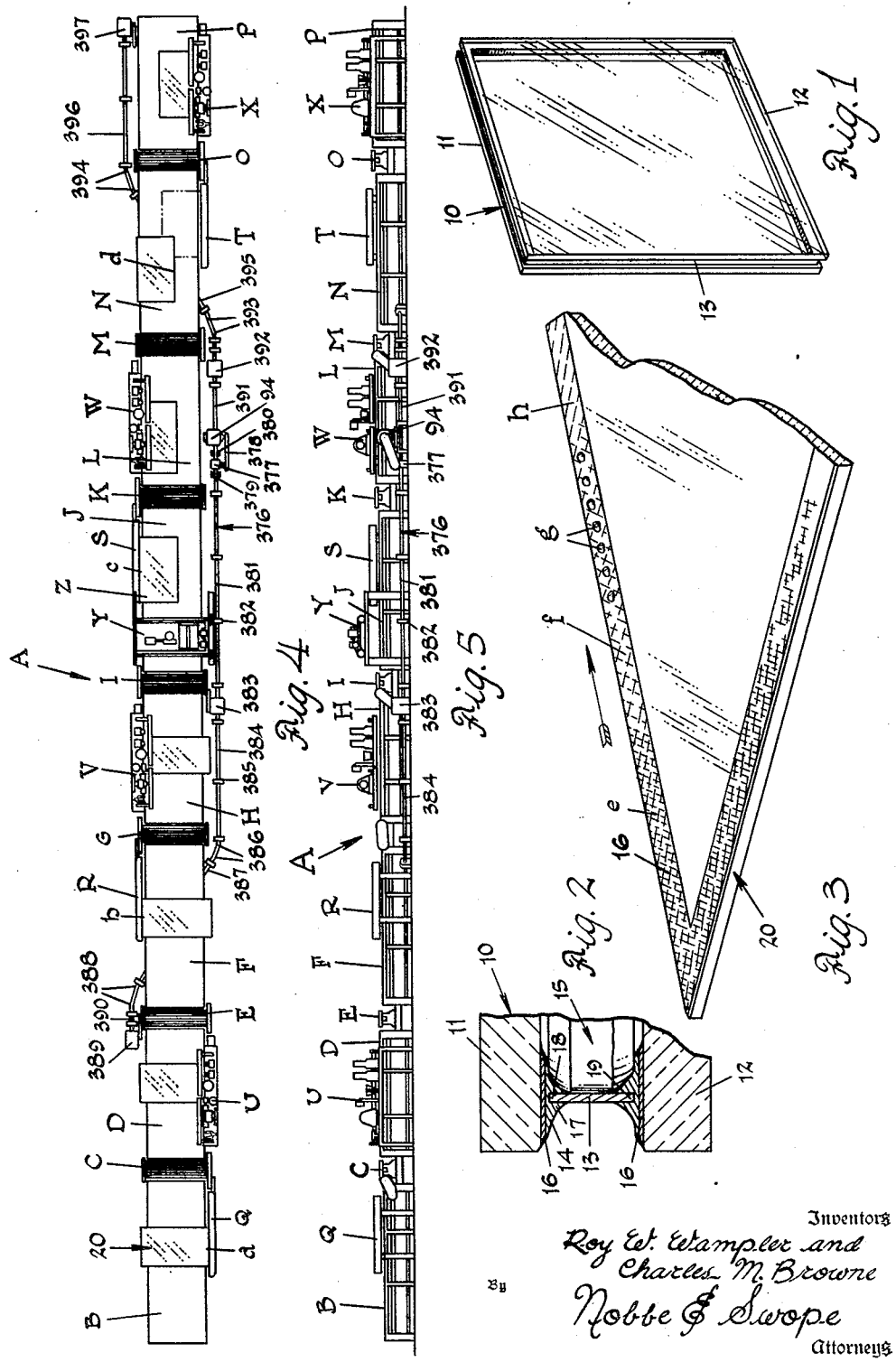

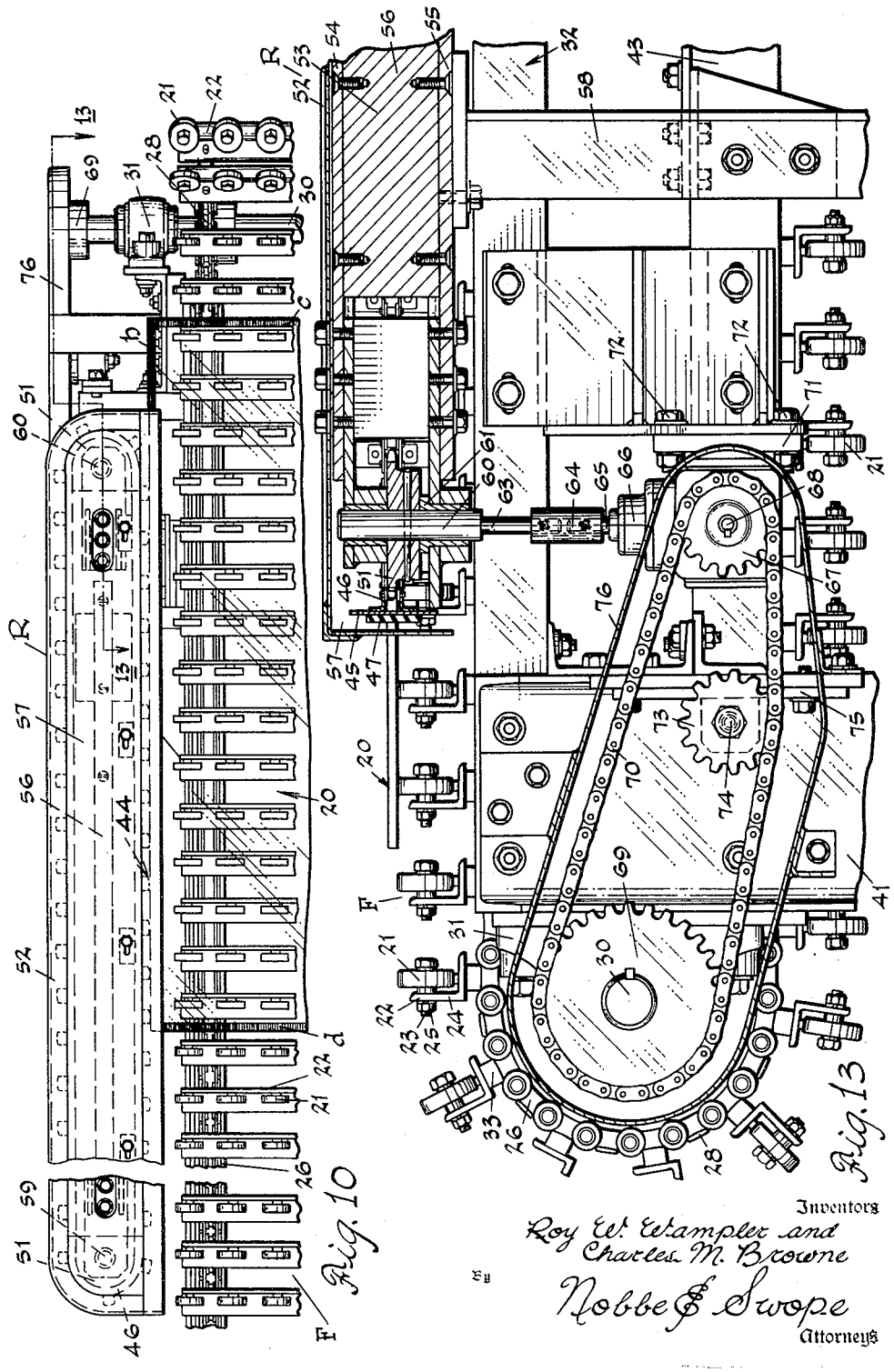

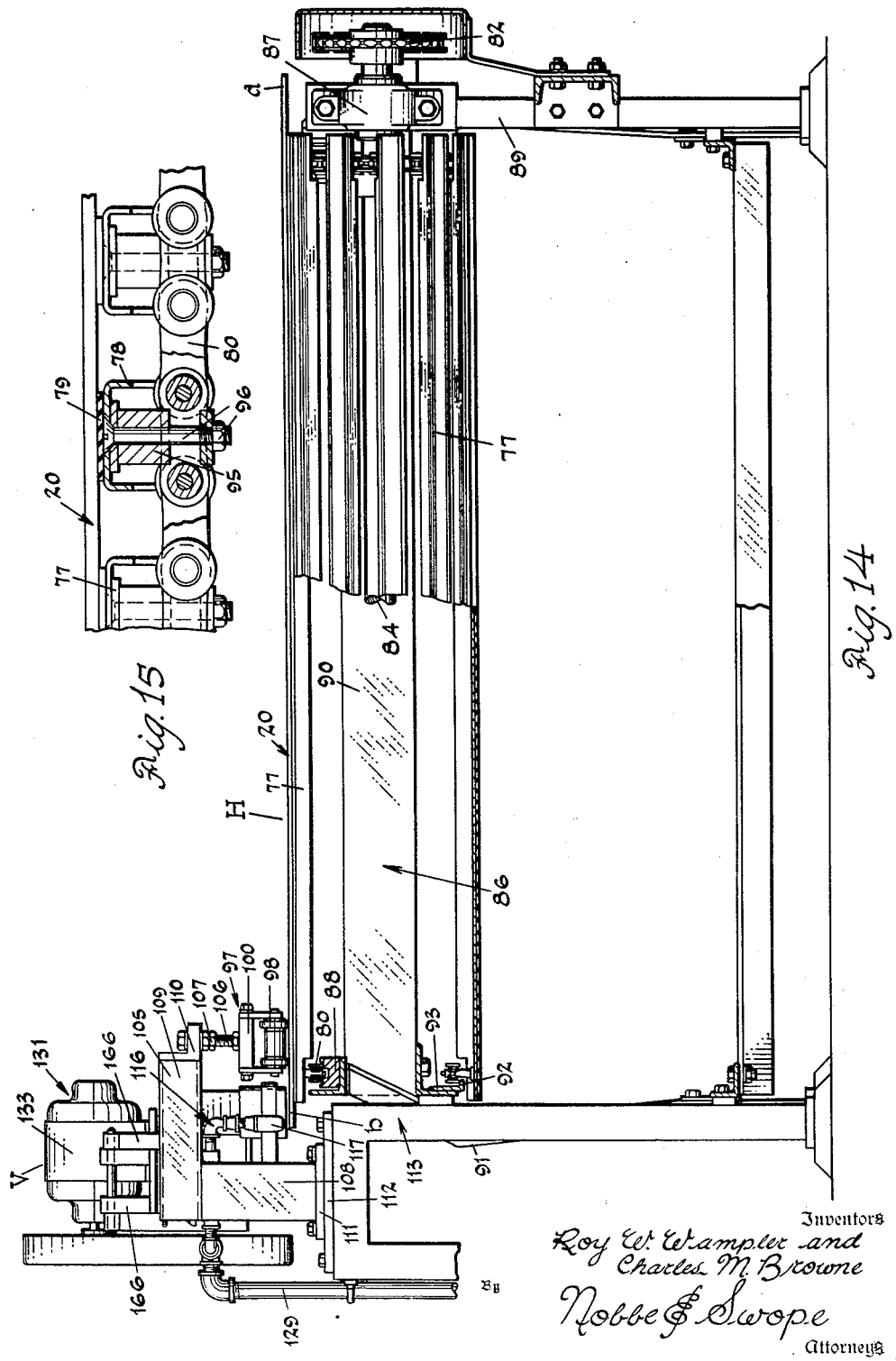

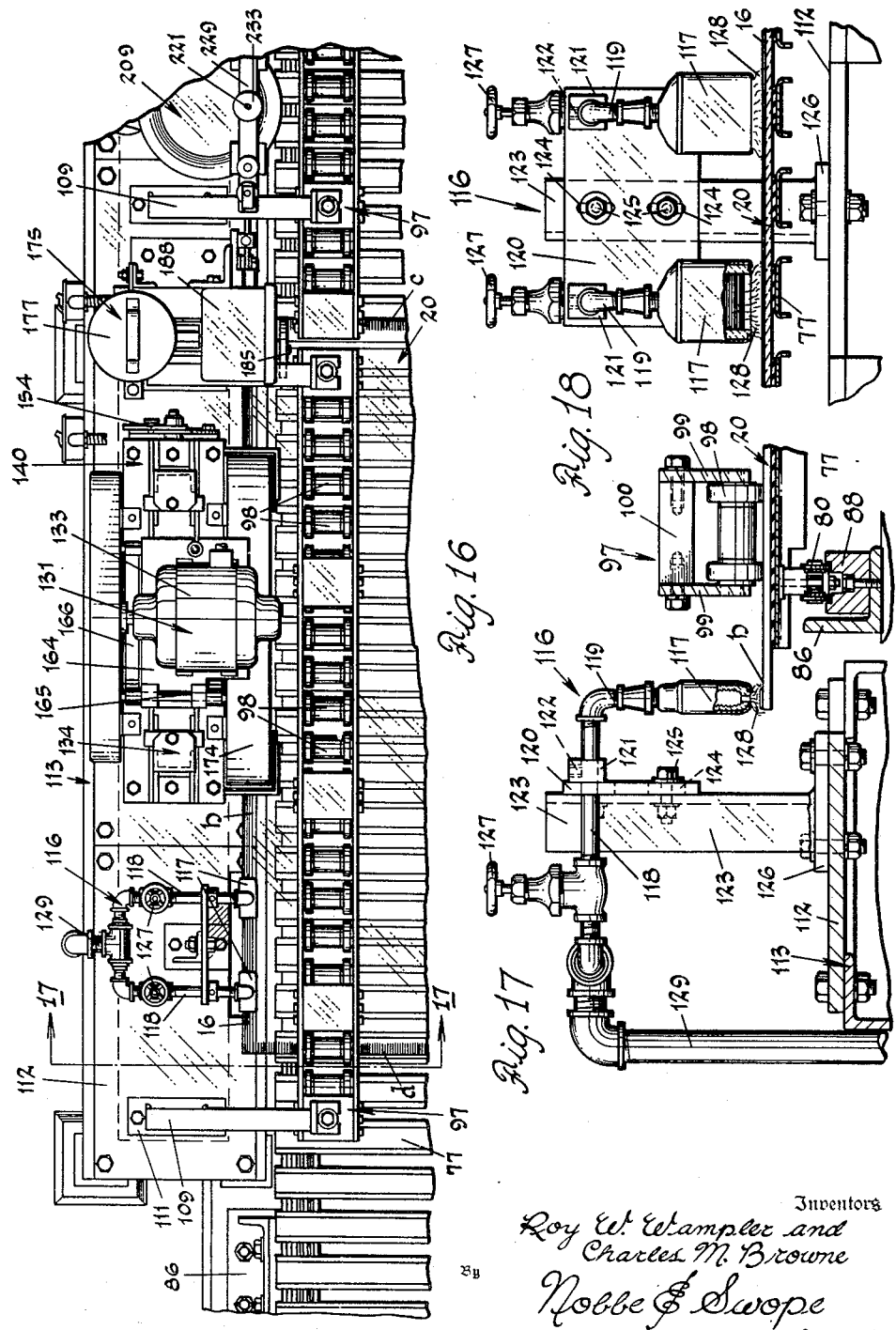

Inventors
Roy W. Wampler and
Charles M. Browne
By Nobbe & Swope
Attorneys

May 31, 1960 R. W. WAMPLER ET AL 2,938,494
APPARATUS FOR SOLDER COATING
Filed Nov. 1, 1952 15 Sheets-Sheet 8
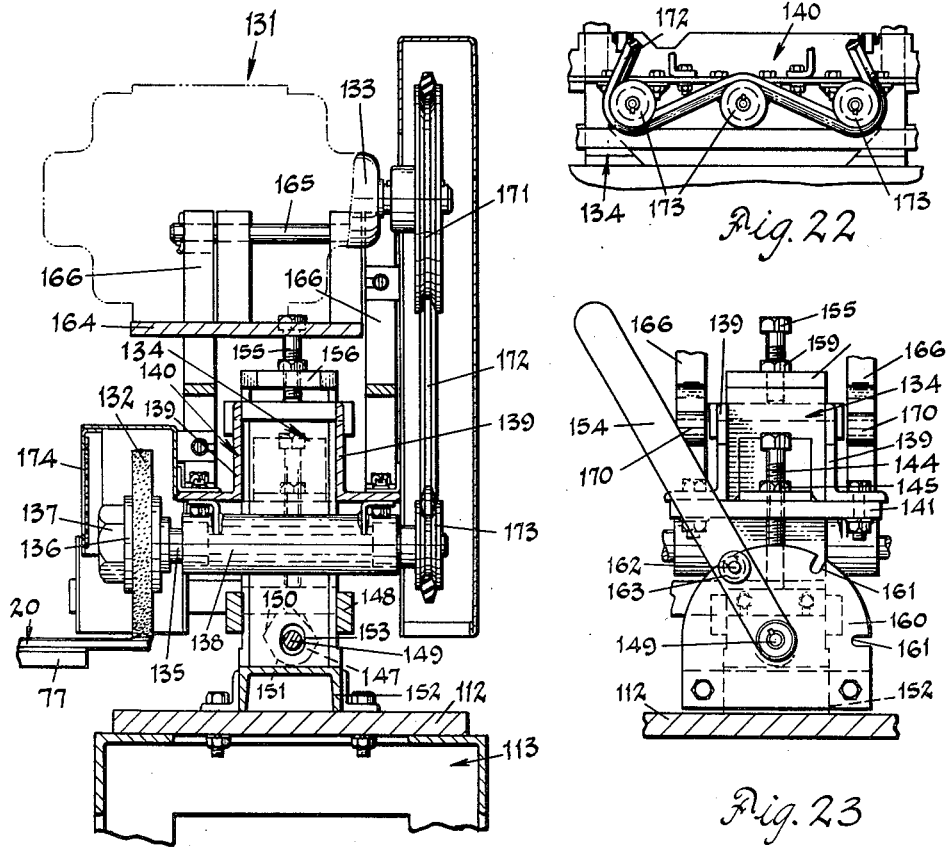
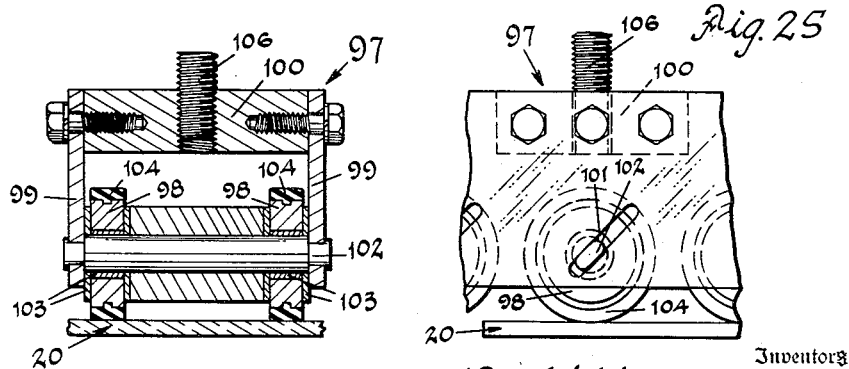
Inventors
Roy W. Wampler and
Charles M. Browne
Nobbe & Swope
Attorneys May 31, 1960  R. W. WAMPLER ET AL  2,938,494
APPARATUS FOR SOLDER COATING
Filed Nov. 1, 1952  15 Sheets-Sheet 9

Inventors
Roy W. Wampler and
Charles M. Browne
Nobbe & Swope
Attorneys

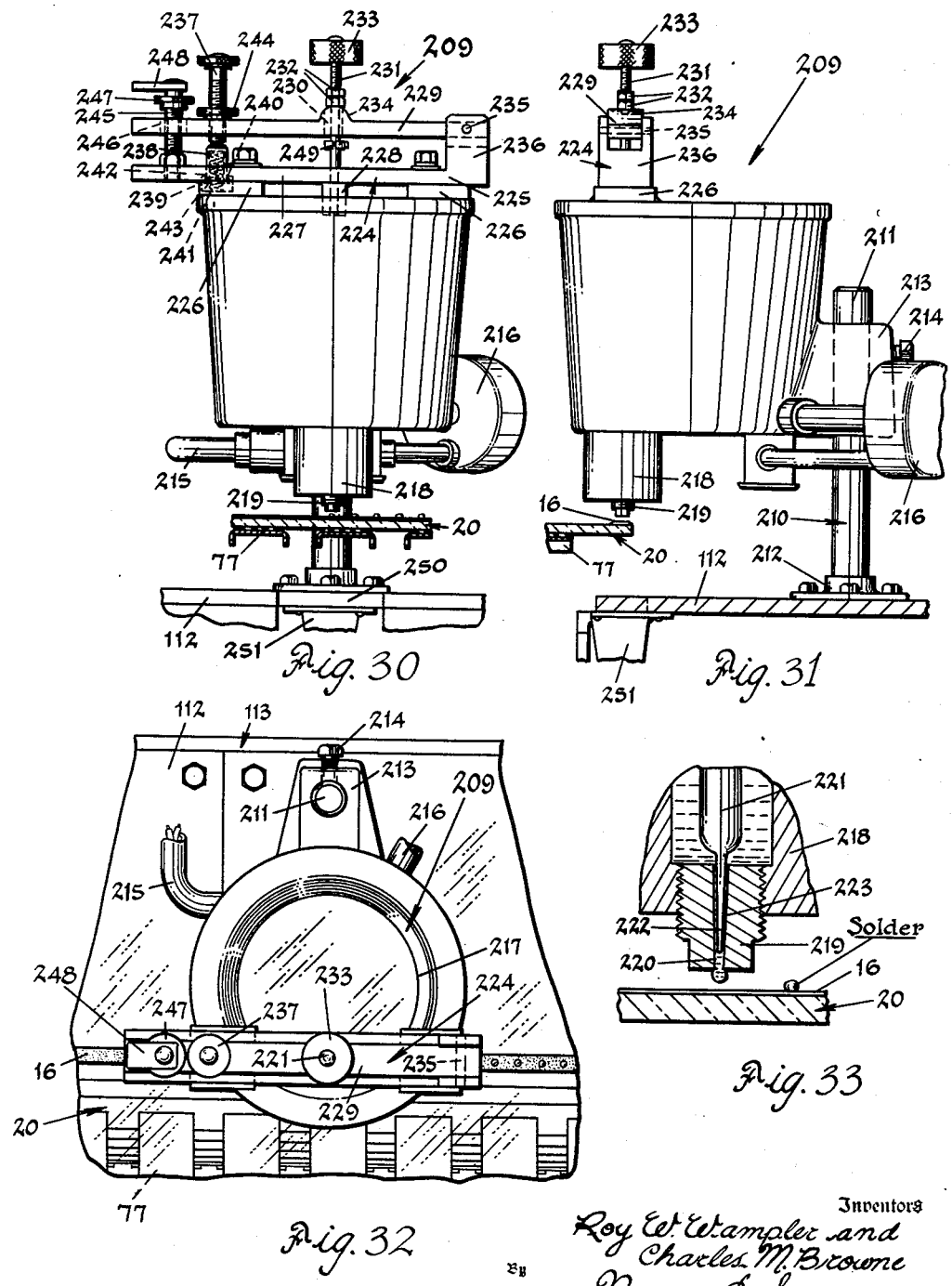

May 31, 1960 R. W. WAMPLER ET AL 2,938,494
APPARATUS FOR SOLDER COATING
Filed Nov. 1, 1952 15 Sheets-Sheet 11

Inventors
Roy W. Wampler and
Charles M. Browne
By Nobbe & Swope
Attorneys

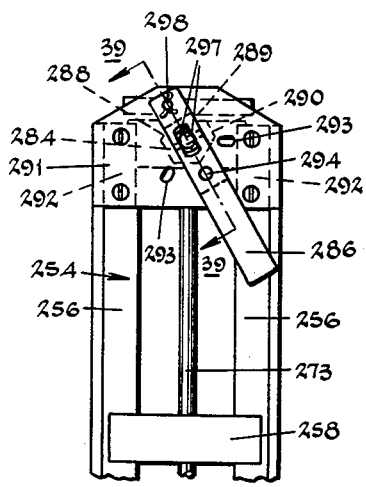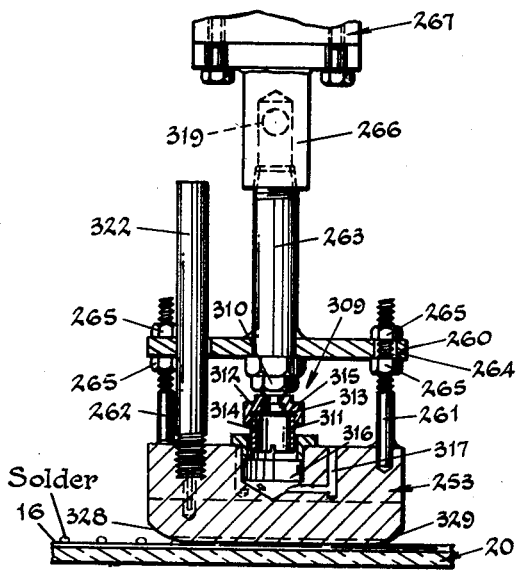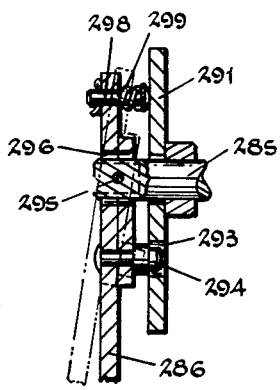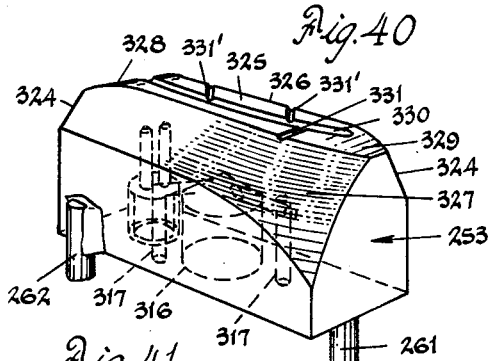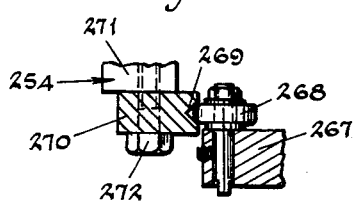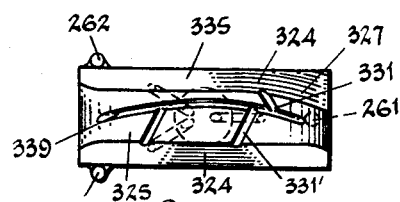

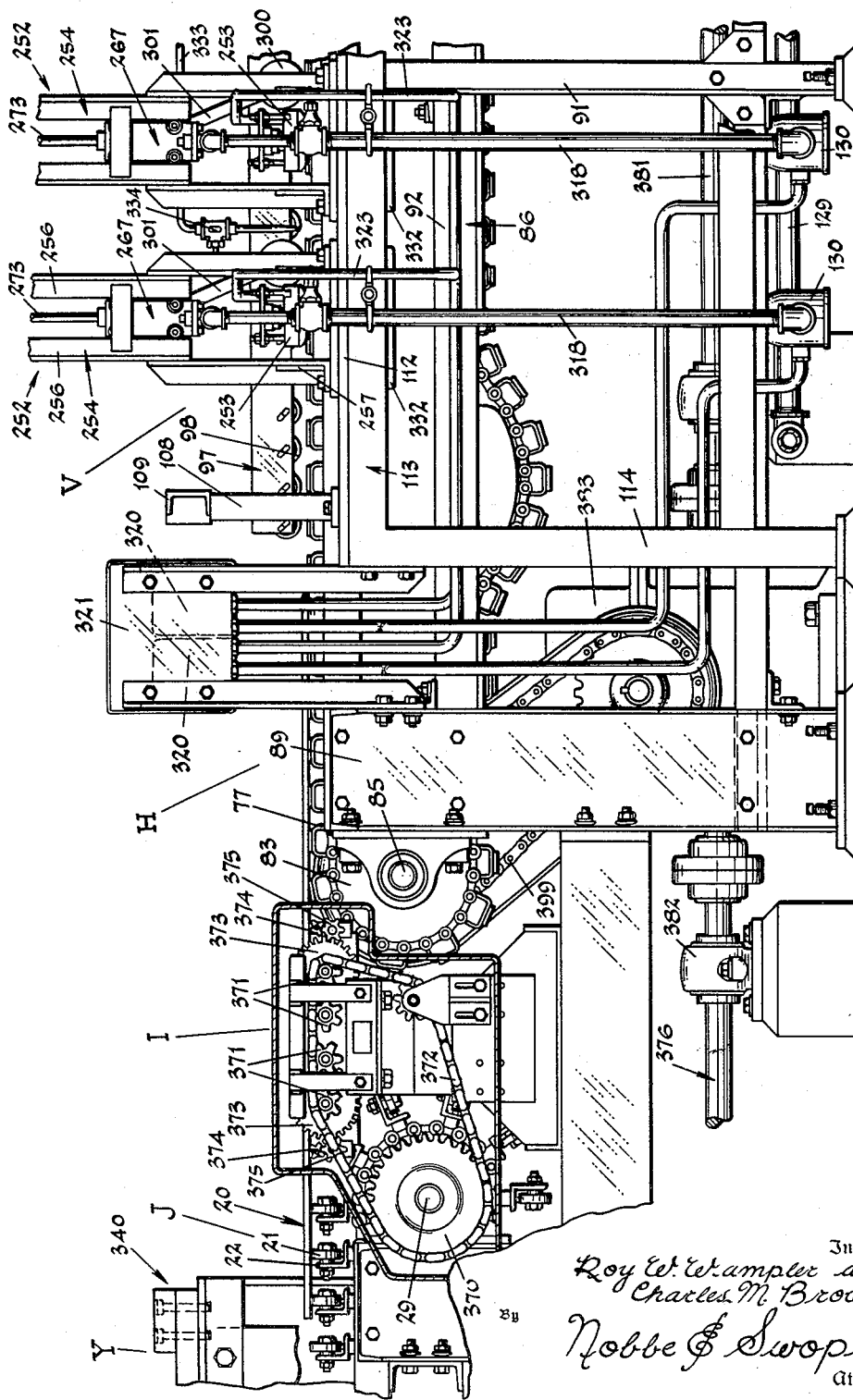

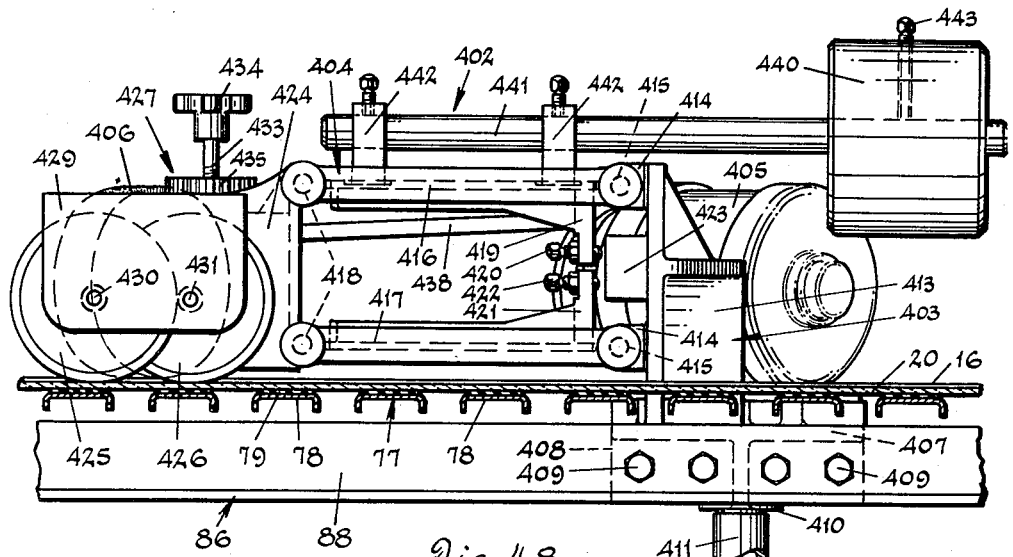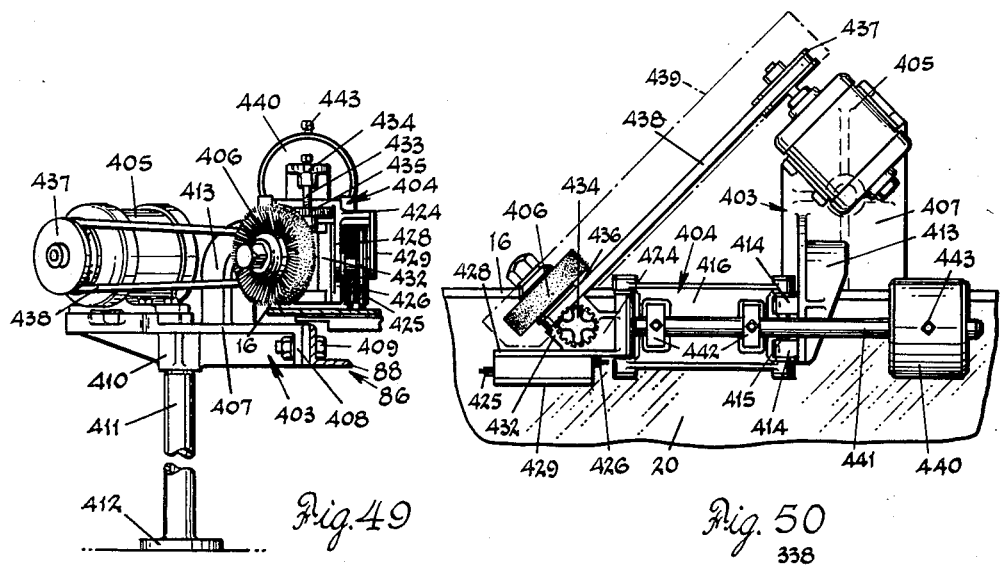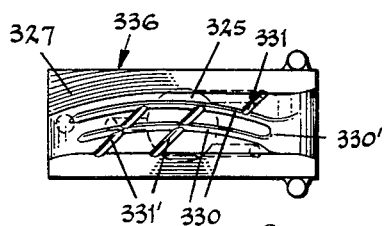

United States Patent Office 2,938,494
Patented May 31, 1960

2,938,494

APPARATUS FOR SOLDER COATING

Roy W. Wampler and Charles M. Browne, Toledo, Ohio, assignors to Libbey-Owens-Ford Glass Company, Toledo, Ohio, a corporation of Ohio Filed Nov. 1, 1952, Ser. No. 318,170

5 Claims. (Cl. 118—74)

The present invention relates to the tinning or solder coating of metal surfaces, and more particularly to an improved method and apparatus for continuously tinning metallized surfaces on glass sheets that are to be used in the production of multiple glass sheet glazing units.

Briefly stated, by the method of the invention, a metal, or metallized surface can be subjected to a reducing atmosphere, burnished, fluxed and finally coated uniformly with solder or other bond-inducing metal in a succession of continuing operations while the surface is moving forward along a definite predetermined path.

This application is a continuation-in-part of our copending application, Serial No. 792,698, filed December 19, 1947, now abandoned.

The primary object of the invention is to provide a completely automatic means of rapidly and effectively tinning or solder coating a metal surface in an efficient and economical manner that will lend itself to the continuous commercial production of articles having soldered or sweated joints.

Among the more specific objects is the provision of a special type of conveying and positioning or aligning mechanism whereby the work to be treated will be properly presented to the successive conditioning and treating elements during its travel along the tinning line.

Another object is to provide a novel burner means for subjecting a metal surface, and particularly a newly formed metal surface, to a reducing flame for the purpose of reducing the oxides which are formed by oxidation of the metal when exposed to the air.

Another object is the provision of novel means for burnishing the metal surface to remove projections and loose particles and to smooth and level the surface to be tinned.

Another object is to provide a special apparatus for applying flux to the reduced and burnished metal surface to be tinned.

Another object is the provision of novel means for depositing a predetermined amount of solder in drop formation to the fluxed surface.

Another object is to provide a heated tool of novel construction for spreading or ironing the above mentioned drops of solder into a smooth, even and uniform coating that is tightly adherent to the metal surface.

Still another object is the provision of a plurality of sets of reducing, burnishing, fluxing and solder applying elements disposed along a continuous tinning line, together with means in advance of and interposed between the several sets for positioning, aligning, and turning the work whereby four metallized marginal portions of a glass sheet can be treated successively while such sheet is continuously moving in a substantially straight line.

Other objects and advantages of the invention will become more apparent during the course of the following description, when taken in connection with the accompanying drawings.

In the drawings, wherein like numerals are employed to designate like parts throughout the same:

Fig. 1 is a perspective view of a completed all glass-metal multiple sheet glazing unit;

Fig. 2 is an enlarged sectional view of one edge of the unit of Fig. 1, showing the metal separator strip soldered to metallized coatings on the glass sheets;

Fig. 3 is a perspective view of a corner of a glass sheet illustrating the sequence of operations in the soldering or tinning technique of the invention;

Fig. 4 is a plan view of a tinning line constructed in accordance with the invention;

Fig. 5 is a side elevational view of the line of Fig. 4;

Fig. 6 is an enlarged view of one portion of the line illustrated in Fig. 5, showing the mechanism by which a glass sheet after being tinned along one margin is repositioned, tinned or solder coated along the opposite margin, and then again repositioned for subsequent solder coating of another margin;

Fig. 7 is a top view also on an enlarged scale of the portion of the line shown in Fig. 6;

Fig. 8 is a transverse sectional view taken substantially on the line 8—8 indicated in Fig. 6, showing the registration of the glass against a flexible aligning unit;

Fig. 9 is a fragmentary sectional view through the conveyor shown in Fig. 8 and upon which glass sheets are carried through the line and may be shifted transversely to the direction of their general movement;

Fig. 10 is a partial top view on an enlarged scale of the aligning unit shown in Fig. 8;

Fig. 11 is a fragmentary, perspective, detail view of the flexible aligning elements of the aligning unit;

Fig. 12 is a fragmentary cross section of the supporting and retaining members for the aligning elements shown in Fig. 11;

Fig. 13 is a section taken on the plane of the line 13—13, in Fig. 10, and illustrates the drive mechanism for the aligning unit;

Fig. 14 is a section taken on the plane of the line 14—14 as indicated in Fig. 7, and is generally an end view of one of the sets of reducing, burnishing, fluxing, and solder applying elements disposed along the line. The supporting, conveying, and hold down mechanisms for the glass sheets are also shown;

Fig. 15 is a fragmentary detail view, partly in section, of the conveying and supporting means shown in Fig. 14;

Fig. 16 is a partial top view of one of the sets of elements mentioned in the description of Fig. 14;

Fig. 17 is a view of a section taken substantially on the line 17—17 indicated in Fig. 6, showing a side view of the unit which applies a reducing flame to the oxidized metal coating;

Fig. 18 is a front elevational view of the reducing unit shown in Fig. 17;

Fig. 21 is a view of a section taken on the line 21—21 in Fig. 19, through the burnishing unit;

Fig. 22 is a view of a part of the rear of the unit shown in Figs. 19 to 21, to illustrate particularly the method whereby the burnishing brushes are reversed in the direction of their rotation;

Fig. 23 is an end view of the burnishing unit illustrating the lift control for the brushes;

Fig. 24 is a sectional view through the glass hold-down device;

Fig. 25 is a fragmentary side view of a portion of the hold-down device;

Fig. 30 is a front elevational view of one of the solder depositing device;

Fig. 31 is a side elevational view of the solder depositing device shown in Fig. 30;

Fig. 32 is a top view of the same solder depositing device;

Fig. 33 is an enlarged cross sectional view of the solder drop producing valve;

Fig. 34 taken in conjunction with Fig. 16 illustrates one complete set of reducing, burnishing, fluxing, and solder applying units;

Fig. 37 is a view of a section taken on the line 37—37 as indicated in Fig. 35;

Fig. 38 is a fragmentary rear view of the same ironing device and particularly the control lever for the adjusting means;

Fig. 39 is a view of a section taken on the line 39—39 in Fig. 38. The view illustrates, in full and phantom lines, the lock and release of the control lever;

Fig. 40 is a vertical sectional view of the soldering or spreading iron or shoe and of the heating means and control therefor;

Fig. 41 is a perspective view of the solder spreading iron in an inverted position to illustrate the solder working surface;

Fig. 42 is a bottom view of a modified form of soldering iron to be used on the second one of each pair of solder spreading devices;

Fig. 43 is a fragmentary side elevation of a part of the machine, showing an end of one of the solder applying units and the drive for one of the intermediate conveyors which are positioned between the tinning conveyors and the aligning conveyors;

Fig. 46 is a view similar to Fig. 42 of the working surface of a modified form of soldering iron;

Fig. 47 is a diagrammatic view illustrating the operation of the soldering irons;

Fig. 48 is a side elevation of a modified form of burnishing or abrading unit;

Fig. 49 is an end view of the unit of Fig. 48; and

Fig. 50 is a top or plan view thereof.

Figure 19:
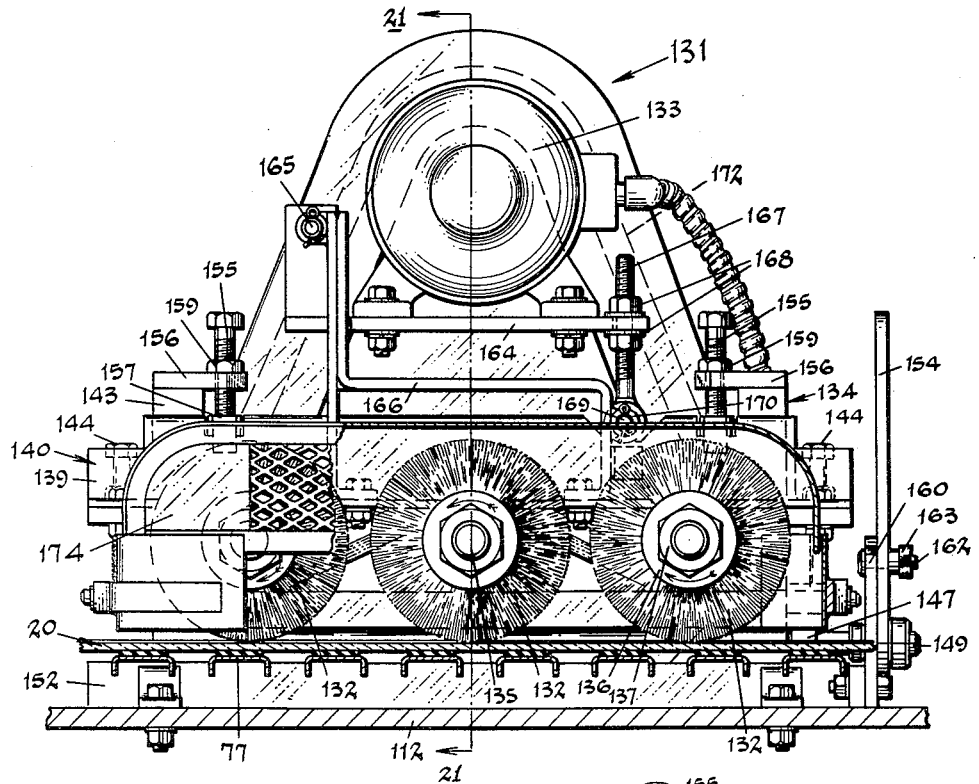
Fig. 19 is a front elevational view of the burnishing or abrading unit.

Although the solder coating method and apparatus of this invention is not limited to use in the production of any specific product, it has already proved so valuable in the production of metal-to-glass seals in all glass-metal, multiple sheet glazing units, such as Libbey-Owens-Ford's "Thermopane," that it will be described in that connection here.

Referring now more particularly to the drawings, there has been shown in Fig. 1 a multiple glass sheet glazing unit of the character referred to above. As shown, the unit, which is designated in its entirety by the numeral 10 comprises two sheets of glass 11 and 12 which are held in spaced face to face relation to one another by a separator strip 13 arranged between the two sheets, around the marginal portions thereof.

As best shown in Fig. 2, the separator strip 13 forms a part of a metal seal designated in its entirely by the numeral 14 and which is adapted to hermetically seal the air space 15 formed between the opposing faces of the glass sheets. The complete metal seal 14 includes tightly adherent, sprayed metal coatings 16 on the glass sheets, to which the separator strip 13 is secured by solder joints 17.

In producing these units, the glass sheets are first metallized by spraying the continuous metal bands or ribbons 16 around the marginal portions thereof. The second step is to tin or coat the metal bands with solder, and the final or assembly step consists in sweating the metal separator strip 13, which has previously had its edge portions 18 and 19 coated with solder, to the tinned surfaces of the metal bands on the glass sheets.

The steps of metallizing the glass sheets, and the final assembly steps are fully described in the patent to C. D. Haven et al., 2,235,681, dated March 18, 1941, and form no part of the present invention.

However, it has been found in actual commercial production that this invention provides an improved method and apparatus for conditioning and tinning the metal coatings on the glass sheets preparatory to the assembling operation, and that by employing the techniques of the invention, better, more permanent and more durable seals are obtained.

This is readily understandable because in ordinary use, such all glass and metal glazing units are subjected to differentials of temperature as in buildings where the outer sheet is exposed to seasonal climatic changes, while the inner sheet is exposed to the more uniform and generally higher temperatures within the building. Similarly, in refrigerator cases, the inner sheet may be subjected to uniformly cold temperatures while the outer sheet is exposed to varying and considerable higher temperatures. These temperature differentials between the different parts of the glazing unit cause one sheet of glass to expand or contract to a greater or lesser extent than the other sheet and set up a severe strain upon the bond, or joint between the glass sheets and the separator means. Consequently, the success or failure of the unit can be said to hinge on the solder joint between the metal separator and the metallized glass, and the tinning method and apparatus of this invention will insure an intimate bond between the solder layer and the metal coating on the glass.

Briefly stated, the apparatus of the invention comprises a continuous tinning line designated in its entirety by the letter A (Figs. 4 and 5) and which is made up of a plurality of successive aligning conveyors B, F, J and N; intermediate conveyors C, E, G, I, K, M and O; and tinning conveyors D, H, L, and P. Disposed successively along the tinning line, some on one side of the line and some on the other, are a plurality of aligning units Q, R, S, and T; and sets of reducing, burnishing, fluxing and solder applying units indicated generally as U, V, W, and X.

In use, a glass sheet 20 to be tinned, and which has previously been metallized to provide tightly adherent marginal bands 16 thereon, is placed on the first aligning conveyor B and, during its movement thereover, is shifted transversely against the aligning unit Q to properly position the sheet for tinning of its lower short metallized edge a.

From the aligning conveyor B the glass sheet will pass over intermediate conveyor C onto the first tinning conveyor D upon which it will be carried beneath each of the reducing, burnishing, fluxing and solder applying units of the first set, indicated at U, whereby a coating of solder will be applied to the metallized strip a. From this point, the sheet passes over the second intermediate conveyor E to the second aligning conveyor F where it is moved against the aligning unit R and then passes over the third intermediate conveyor G to the second tinning conveyor H and under the set of reducing, burnishing, fluxing and solder applying units V where the top short margin *b* will be tinned.

Leaving the conveyor H, the sheet passes over intermediate conveyor I to aligning conveyor J. On this conveyor, the sheet is picked up by a vacuum frame Y and turned 90° to the position shown at Z, whereupon it is moved against the aligning unit S and positioned to pass over the intermediate conveyor K onto the third tinning conveyor L where the upper long margin *c* of the sheet will be tinned as it passes beneath the set of units W. Then, after passing over the next intermediate conveyor M onto the aligning conveyor N the sheet will be aligned against the unit T and positioned for passage beneath the set of units X upon the conveyor P where the final tinning operation is performed to coat the metallized margin *d*.

Each of the conveyor units are substantially identical in structure with one another; thus the aligning conveyors B, F, J and N are identical, as are the intermediate conveyors C, E, G, I, K, M, and O, and the tinning conveyors D, H, L and P. For this reason it will only be necessary to describe one conveyor of each type in detail, and this can best be done by referring to Figs. 6 and 7 of the drawings, wherein is illustrated a side elevation and plan view respectively of the rear end of the aligning conveyor F, intermediate conveyor G, tinning conveyor H, intermediate conveyor I, and the forward end of aligning conveyor J.

Associated with the tinning conveyor H is the set of reducing, burnishing, fluxing, and solder applying units V, and since all four of the sets of conditioning and tinning units U, V, W and X are substantially identical in structure and operation, a detailed description of the set V will be typical of all.

As explained above, before reaching the tinning line A, the glass sheet 20 to be tinned has been subjected to a suitable metallizing treatment to form a coating of metal 16 on the four margins *a*, *b*, *c* and *d*, thereof (Fig. 4). And, during passage over the first tinning conveyor D, the metal coating on the lower short margin *a*, as viewed in Fig. 4, is suitably tinned by the set of conditioning and tinning units U, so that when the glass sheet 20 reaches the aligning conveyor F (Figs. 6 and 7) it is provided with metal coatings on its four margins, and the metal coating on the margin *a* has been tinned.

It is then necessary to realign the glass sheet 20 as it moves over the conveyor F to properly position it for tinning the short metallized margin *b*. To accomplish this the conveyor F is so constructed that the sheet 20 is received on a plurality of rollers 21, arranged in rows and in endless belt formation (Figs. 8 and 9). Thus, each row of rollers 21 is carried by angle bars 22, the stub axle 23 of each roller being secured in the upwardly extended leg 24 of the bar by a nut 25. The bars 22 are connected at their ends to a pair of roller chain belts 26 which are trained about sprockets 27 and 28 (Figs. 6 and 10); the shafts 29 and 30, respectively, for the sprockets 27 and 28 being journaled in the bearings 31 attached to the end of the frame 32 of the aligning conveyor F. As shown in Fig. 9, a clamping block 33 engages the surfaces of a pair of the links 34, comprising the roller chain belts 26, and a bolt and nut connection 35 serves to tightly secure the parts of the block with respect to the links. The said chain belts 26 are each supplied with supporting rollers 36 which are carried in tracks 37 located in the upper ends of the frame on framing angle members 38. The angle members 38 are attached to channel members 39 that extend crosswise between the legs 40 or end columns 41. The returning portions of the roller chain belts 26 are supported on a ledge 42 afforded by a welded construction 43 depending from the channel members 39. The shaft 30, which may be defined as the "driving" shaft of the conveyor F is suitably interconnected with the tinning conveyor H, as shown in Fig. 6, so that the pair of units can be driven from a common source as will be further described hereinafter.

During its movement across the conveyor F, the sheet 20 is shifted transversely, as shown in Fig. 8, against an articulated surface, or flexible wall, indicated at 44, that is moved at a rate of speed equal to that at which the bars 22 are moved by the roller chain belts 26. The surface is afforded by a series of resiliently faced plates 45 carried by a chain belt 46 (Fig. 11). The plates 45 have rubber pads 47 vulcanized, or otherwise attached, to one surface while the opposite surface is secured to the bent portions 48 of the attachment links 49 of the chain belt 46 by bolt and nut connections 50. The chain belt 46 is trained about a pair of sprockets 51 (Fig. 10) that are pivotally mounted in the ends of a case 52 (Fig. 13). A frame 53 for the case comprises upper and lower plates 54 and 55 spaced from each other by a bar 56 and to which the housing 57 of the case is secured to enclose the outer and top side portions of the frame 53, as shown in Fig. 8; the inner side being open for movement of the glass against the rubber pads 47. The chain case 52 is mounted, with reference to the frame 32 of the conveyor F, on columns 58 to which the lower plates 55 are bolted. Preferably the pair of sprockets 51 are supported on shafts 59 and 60 that are journaled in bearing brackets 61 secured, as seen in Fig. 13, in the ends of the frame 53.

The plates 45, to which the pads 47 are attached, are restrained from deflection by a plurality of strips 62 that are bolted to the sides of the plates 54 and 55. The strips 62 engage the top and bottom edges of the plates 45, as seen in Figs. 8 and 12, and serve to maintain the series of plates in a straight line while also supporting them and the roller chain between the sprockets 51. The chain belt 46 is driven by one of the sprockets 51, as illustrated in Fig. 13, wherein the shaft 60 is provided with an extension 63 that is connected, through the sleeve 64, to the shaft 65 of a gear reducer unit 66. A gear 67 mounted on the opposed shaft 68 of the unit is connected to a sprocket 69 by a chain belt 70. The gear 69 is keyed to the shaft 30 so that rotation of the shaft 30 to move the roller chain belts 26 will be transmitted through the chain belt 70 and reducer unit 66, to also drive the sprockets 51 and chain belt 46.

The reducer unit 66 is adjustably mounted on a bracket 71 attached to the frame 32 and may be shifted as desired by loosening of the bolts 72. Any slack in the chain belt 70 may be compensated for by an idler gear 73 superimposed between the gears 67 and 69 and rotatably mounted on a stub axle 74 that is mounted in a bracket 75 on a part of the frame 32. The entire chain drive may be suitably enclosed by a cover or case 76 to prevent interference of operation and to maintain the parts in an orderly fashion.

After the glass sheet 20 has been properly aligned by the flexible wall 44 on the conveyor F, it will overhang the conveyor a short distance, as best shown in Fig. 8; in actual practice, a distance of about two inches. From the conveyor F, the aligned sheet is carried over the intermediate conveyor G and onto the tinning conveyor H where it is received and moved forward on a slat type conveyor belt 77 (Figs. 14 and 15) forming a part thereof. The belt 77 is made up of a plurality of channel members 78, each of which is provided with a resilient, cushioning surface afforded by a layer of rubber 79 vulcanized to the surface of the channel members. The ends of the channel members are carried by a pair of roller chain belts 80 that move along the tracks 81 and are trained about pairs of sprockets 82 and 83 (Fig. 43).

The pairs of sprocket gears are keyed to shafts 84 and 85 (Fig. 43) respectively which are journaled at the ends of the frame 86 in bearings 87. The tracks 81 are located on the angular side members 88 of the frame which are supported, between the end columns 89, on framing channels 90. The framing channels are secured to the upper ends of the end columns 89 and intermediate legs 91. The returning sections of the roller chains 80 are supported on a ledge 92 provided by a weldment 93 secured to the lower portions of the framing channels 90.

The shaft 85 of the conveyor H is driven from a common source of power, or motor 94 through suitably mounted shafting which will be described later.

As shown in Fig. 15, the glass supporting channel members 78 of the conveyor belt 77 have clamping block portions 95 engaging the links of the roller chains, and which are secured thereto by a bolt and nut connection 96. By their manner of common mount and interrelation, through the roller chain belts 80, the channel members, when forming the surface of the conveyor belt 77, provide a substantially smooth support for the glass sheet.

During movement of the sheet 20 past the various units of the set of reducing, burnishing and tinning units V, the sheet is held from rising, or shifting out of alignment, by hold-down devices 97, each of which is provided with rollers 98 which ride on the surface of the glass and, by reason of their method of support, exert a freely movable downward weight. The rollers are positioned between side rails 99 that are interconnected by spacer blocks 100 (Figs. 24 and 25). The side rails have slots 101, formed to extend in a diagonal plane, for receiving the flattened ends of the axles 102 of the rollers. These slots 101 are inclined upwardly in the direction of movement of the sheet 20 and so permit the rollers to move freely down into engagement therewith as it moves along the conveyor. At the same time, the hold-down rollers 98 can rise with and so accommodate varying thicknesses of sheets.

The rollers 98 are suitably located on and between bearing members 103 to reduce any frictional resistance to their rotation and have cushioned peripheries, provided by the rubber tires 104, so that there will be no injury to the surface of the glass during their engagement or rolling contact.

The side rails 99 of the hold-down devices 97 are suspended, above the glass sheet, from a frame 105 by threaded rods 106 that may be raised or lowered for positioning of the rollers 98 by movement of the lock nuts 107. The frame 105 comprises a pedestal 108 and arm 109 from which a flange 110 is extended for receiving the threaded rods 106. The base 111 of each pedestal 108 is bolted to a surface plate 112 that provides the top of an auxiliary frame 113. The frame 113 has leg supports 114 which are attached to the main frame 86 of the conveyor unit H by bolts extending through spacer blocks 115 and the weldments 93 of the main frame.

As the glass sheet 20 is thus moved along the line by the conveyor belt 77 and sustained from a tendency to rise or shift out of position by the accumulative weight of the rollers 98 on its surface, the margin $b$ that is to be solder coated, passes beneath the set of reducing, burnishing and tinning units V which are mounted above the tinning conveyor H upon the surface plate 112 of the auxiliary frame 113. As the glass sheet is moved forwardly upon the conveyor H, the portion of the metal coating 16 designated $b$ will be first conditioned and then tinned, as a part of the complete tinning operation, by the various units in the set V.

The first step of the complete tinning operation is to insure that the metal coating 16, which in commercial production is preferably a coating of copper, be perfectly clean and free from contamination. In some cases it may be desirable to wash or otherwise clean the coating but where it is fed directly from the metallizing spray apparatus to the tinning units, it is only necessary to remove the oxides that are formed by the exposure of the newly sprayed coating to the air.

This may be conveniently accomplished by the use of a reducing flame or flames. In the past hydrogen flames have been employed for this purpose, but we have found that the oxides can be satisfactorily reduced by a plurality of properly controlled natural gas flames. To this end the coated margin of the glass is first passed beneath the reducing or burner unit 116 of the set of tinning units V (Fig. 18). This unit comprises a pair of burner heads 117 arranged in tandem. These heads 117 are of the internal combustion type having elongated, ceramic lined combustion chambers into which a controlled mixture of natural gas and air is introduced and burned to produce a flame of reducing characteristics. The burner orifice of each head is similar in shape to the combustion chamber but is of restricted area as shown in Figs. 17 and 18.

The heads are attached to support pipes 118 by pipe elbows 119. The pipes are mounted in a plate 120 having bosses 121 through which the pipes extend and in which they are secured by set screws 122. The burner heads may thus be positioned with reference to the neighboring units and the glass edge before adjustment of the set screws. The plate 120 is carried by a standard 123, means being provided by the slots 124 and bolts 125 for obtaining the desired height of the burner heads. In actual practice we have found that best results are obtained with the burners from ½ to ¾ of an inch above the glass. The standard 123 is attached to the surface plate 112 by bolts extended through the base plate 126.

Each of the pipes 118 has a manual control valve 127 for modifying the intensity or the effectiveness of the flame, as shown at 128, in Figs. 17 and 18. The pipes are connected to a common supply pipe 129 that extends to a source of supply and to protect the machine against explosion or conflagration, suitable fire trapping devices 130, such as are shown in Fig. 43, may be located in the supply pipe 129 so that upon the occurrence of an incorrect mixture, or other contingencies, with a resultant transmission of the flame into the pipe, the device 130 will automatically close to shut off the gas supply in a manner well known in the art. As already indicated, it is necessary to operate the burner heads 117 at a temperature that will reduce the oxides, but at the same time it is essential that the glass not be allowed to become too hot because excessive heat will result in reoxidation of the metallic coating.

When the oxides have been reduced in the manner just described it will be found that weaker solutions of flux may be used in the subsequent tinning operations without any time being lost for the reaction of the flux to take place.

Upon leaving the reducing flames, the metal coated glass margin $b$ passes beneath a burnishing unit indicated generally at 131 for the purpose of smoothing and leveling the copper coating prior to the actual tinning, and to remove any remaining oxides. This unit is best indicated in Figs. 6, 7, 16 and 21 to 23 and comprises three wire brush wheels 132 which, in rotating on the metallic coating 16, abrade and level the peaks from the surface of the coating. In the spray gun method ordinarily employed for deposition of the copper or copper alloy, it has been found virtually impossible to obtain a minutely smooth surface since the interlaying particles of the alloy from a characteristically ridged effect if inspected microscopically. The peaked, or ridged, effect thus produced prevents an even layer of solder by reason of the fact that during the solder coating, the flow inducing element engages and rides on the obstructing peaks without contacting the lower areas of the metallic coating surface and thereby leaves an irregular solder coat surface. The brushes 132, therefore, smooth out the higher points of the copper deposition and induce the preparation of an even surface over the entire metallized coating.

We prefer that the brushes 132 be wire brushes. Wires having a diameter of .003″ have been successfully used for this purpose, be we believe that wire diameters of .004″ may be even better.

Besides the brushes 132, the unit 131 includes a motor 133 and a supporting frame 134 for the unit. Each of the brushes 132 is clamped to a shaft 135 by washer 136 and a nut 137 threaded onto the end of the shaft. Each shaft is journaled in a bearing sleeve 138. The sleeves are bolted to angle plates 139, which form the side rails of a movable carriage or support 140 and are interconnected at their ends by bars 141. The surfaces of the opposed leg portions 142 of the angle plate 139 slidably engage the sides of stationary standards 143 of the frame 134. The rectangular movable support 140 thus provided for the brushes 132 is adjustably sustained at any desired height by means of bolts 144 located in the bars 141 and having lock nuts 145 threaded thereon. The ends of the bolts 144 rest on blocks 146 which in turn are supported on the surfaces of cam members 147 (Fig. 21). The blocks 146 are interconnected by straps 148, attached by welding to the blocks and extending along the sides of the standards 143 below the angle plates 139. Upon rotation of a shaft 149, on which the cams 147 are mounted, the blocks 146 will urge the rectangular support 140 upward or downward according to the differential of distance between any of the surfaces 150 of the cams 147 and the bearing surface 151 thereof which support the cams with reference to the base 152 of the stationary frame 134.

The brushes 132 may accordingly be adjusted for varying thicknesses of glass to assure an effective burnishing of the metallic coating with a uniformity of result. Preferably, the web of the standards 143, which may be fabricated from channel iron, has slotted openings 153 for movement of the shaft 149 upon its rotation by a lever 154 to effect a change in height of the brushes 132 with reference to the glass surface. The bolts 144 may also be individually manipulated to level the relation of the support 140 to the blocks 146, or the relation of the two outer brushes 132 with reference to each other and to the surface of the glass.

Figure 20:
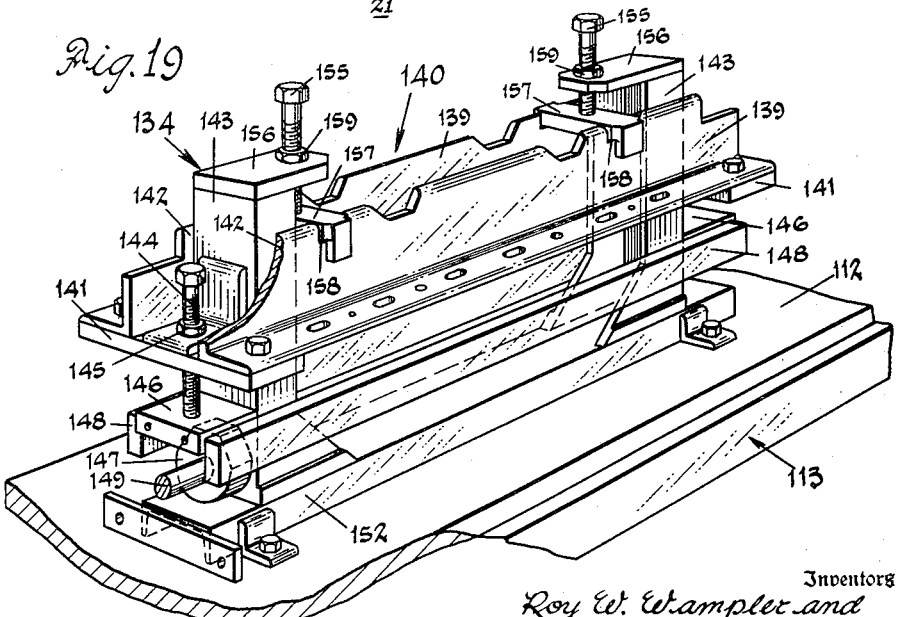
Fig. 20 is a view in perspective of the supporting framework for the burnishing unit.

When the desired position for the brushes 132 has been obtained, the rectangular support 140 is secured from any movement by a pair of bolts 155 that are threaded into cap plates 156 secured at the tops of the standards 143. As shown in Fig. 20, the bolts are threaded into engagement with clamping bars 157 that are located in notches 158 provided in the leg portions 142 of the angle plates 139. Having tightened the bolts 155 against the bars 157, the lock nuts 159 may be turned to secure the screws from any loosening rotation. The rectangular support 140 for the brush shafts 135 will thus be held from movement, and rattling or shaking of the related parts will be substantially impossible.

The lever 154 is keyed to one end of the shaft 149 and its position, according to the surfaces 150 of the cams 147, may be determined by a locking plate 160 which is bolted to an end of the base 152. The locking plate has a number of notches 161 for receiving a latching bolt 162 carried by the lever 154. As shown in Fig. 23, the notches 161 are located in the periphery of the plate 160 in angular registry with the positioning of the surfaces 150 of the cams 147 with respect to the blocks 146 and upon selection of the correct surfaces to procure the desired brush height, a clamp unit 163 on the bolt 162 may be turned to lock the lever to the plate 160.

In order that the motor 133 may be suitably mounted and that the drive between the motor and shafts 135 will not require adjustment after change of position of the rectangular support 140, a mounting plate 164 for the motor is carried by the said support. As shown in the drawings, the mounting plate 164 is pivotally connected at one end by a rod 165 to a pair of suitably bent frame members 166. The frame members are secured to the angle plates 139 (Fig. 19). The opposite end of the plate 164 is adjustably supported by a bolt 167 having nuts 168 threaded against surfaces of the plate. The bolt 167 is attached by welding to a rod 169, the ends of which are located in collars 170 secured to the frame members 166.

The shaft of the motor 133 has a pulley 171 mounted thereon which receives a double V belt 172 to drive pulleys 173 mounted on the shafts 135. The belt is trained about the pulleys 173 to rotate the outer shafts 135 in one common direction while the intermediate shaft 135 is rotated in the opposite direction. The brushes 132 accordingly perform their abrading, or burnishing, functions on the metallized coating 16 in such a manner as to assure that smoothing of the ridges, or peaked areas, of the coating will be effected regardless of the angle at which they project from the general surface. To compensate for the tension condition of pulley belt 172, the nuts 168 may be shifted on the bolt 167 to raise or lower the motor mounting plate 164 with reference to the common axial plane of the shafts 135. If desired, to prevent undue throwing of the abraded particles and, at the same time, afford a suitable guard for the brushes 132, a case as indicated at 174 may be secured to the rectangular support 140.

From the abrading unit 131, the properly conditioned metallized margin b of the glass sheet moves beneath a fluxing unit indicated generally at 175, and best shown in Figs. 26 to 29. This unit includes a flux applying wheel 176 which receives quantities of flux, during contact with the glass, from a reservoir 177 through an electrically controlled valve 178. The flux is employed as a matter of precaution, to insure the utmost of cleanliness and to obtain a permanent and satisfactory union between the metallic coating 16 and the solder coat to be applied thereto. Preferably, the flux is applied in liquid form as the metallized glass sheet passes in rolling contact beneath the wheel 176.

Various combinations of "stock fluxes" can be used for the purpose, but we have had best results with a dilution of a mixture of 37.5 pounds of abietic acid (commercial grade), 46.5 pounds of triethanolamine and 46.55 pounds of diethylene glycol. One part of this mixture is preferably diluted with eight parts of a diluent, and we prefer isopropyl alcohol for this purpose.

A flux of this dilution will flow easily and we have determined that a sufficient amount of the flux will be made available when it is fed at the rate of two drops per second when the conveyor is moving at approximately twenty feet per minute. This amount will adequately cover the metal coating and at the same time will not result in an objectionable flooding of the exposed glass surface.

Figure 28:
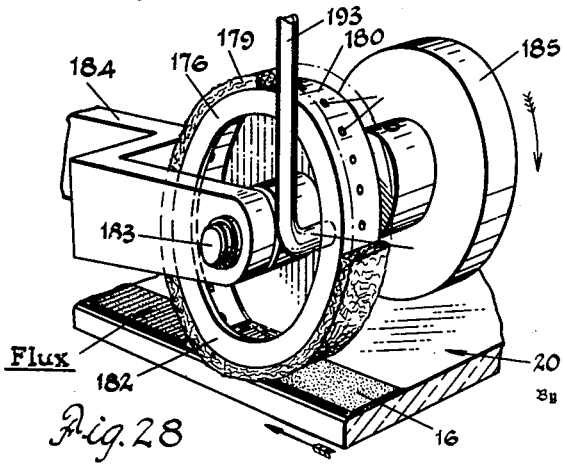
Fig. 28 is a view in perspective to illustrate the flux applying wheel and its contact to the glass, the parts of the unit being located as shown in Fig. 26.
Figure 29:
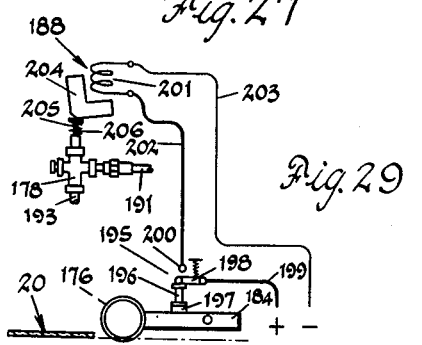
Fig. 29 is a view of an electrical diagram showing how the flow of liquid flux, from the reservoir to the applying wheel of the flux dispensing unit, is automatically controlled.
Figure 34:
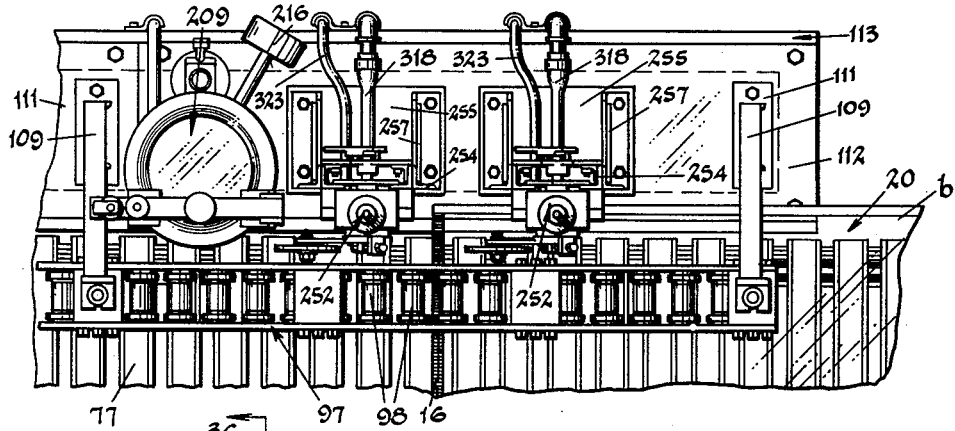
Fig. 34 is a partial top view of the solder coating unit and illustrates the relative locations of the solder depositing device and the ironing or spreading device.

At this rate of feed, the felt, or similar composition, band 179, forming the outer surface of the wheel 176, is constantly saturated and the periphery 180 of the wheel, to which the band 179 is secured, is perforated, as at 181 (Fig. 28), so that the saturation will be uniform, while the flange 182 has sufficient width to allow retention of a quantity of the flux within the wheel. To prevent "puddling" or gathering of the liquid in one area, particularly the lower portions of the felt band, the wheel 176 is rotated continuously during the interval between its riding contact with the glass sheets. The wheel is mounted on a shaft 183 carried by a yoke type lever arm 184. Exterior to the arm 184, a second wheel 185 is mounted on the shaft 183. The wheel 185 is smaller in diameter than the wheel 176 in order that it will not engage the edges or surface of the glass. However, when the wheel 176 leaves the following edge of the glass sheet, it will permit riding engagement of the wheel 185 on the surfaces of the channel members 78 of the conveyor belt 77. The smaller wheel will thus revolve the shaft 183 and wheel 176 to prevent the flux from moving through the perforations 181 and into one localized area. (Fig. 28.)

The lever arm 184 is pivotally mounted by a shoulder bolt 186 on an angle bar 187 that forms a stand for supporting the parts of the fluxing unit, which comprises the reservoir 177 and the electrical mechanism 188 for actuating the valve 178. The case of the reservoir has a flange part 189 by which it is attached to an extending part 190 of the stand. The reservoir is connected to one side of the valve 178 by a pipe 191. The valve, in turn, is connected through suitable piping and a visible drop regulator valve 192 to the tubing 193 which terminates in a bent end 194 projecting within the flange 182 of the felt wheel 176. The drip valve 192 is adjusted to allow a flux flow of substantially two drops per second, although this predetermined rate may be modified according to the speed of operation which, in present practice, is approximately 20 feet per minute.

The electrically controlled valve 178 is caused to open by the electrical mechanism 188 which is responsive to a switch 195 located on the stand in position to be actuated by the lever arm 184. The switch 195 is a conventional type of limit switch having a flexible contact that is spring biased in an open position and moved to closed position by a plunger 196. The plunger, preferably of insulation material, is engaged by the lever arm 184 by means of a contactor plate 197. As seen diagrammatically in Fig. 29 of the drawings, the flexible contact 198 of the switch 195 is connected by the line 199 to a source of electrical energy. The fixed contact 200 of the switch is connected to one side of a solenoid coil 201 by a line 202, the other side of the coil being extended to the negative side of the source by the line 203. As the wheel 176 is engaged by the leading edge of the glass (Fig. 26), it is lifted and, in so doing, swings the lever arm 184 about its pivot bolt 186. The contactor plate 197 of the arm depresses the plunger 196 of the switch whereupon the contact 198 will engage the contact 200 and a circuit will be established from the power line 199 to the coil 201. The armature 204 of the coil will then be moved inwardly and allow the influence of a spring 205 to lift the valve stem 206 of the valve 178. The pipe 191 will now communicate with the tubing 193 through the valve 178 and the drip valve 192, that may be adjusted to regulate the ultimate quantity of flux released to the wheel 176.

Figure 27:
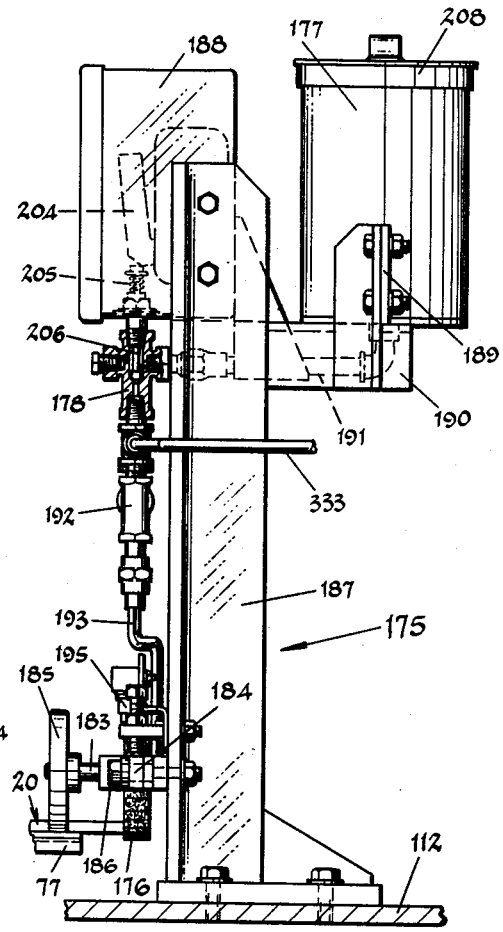
Fig. 27 is a side elevational view of the flux dispensing unit, showing the flux applying wheel in the idle position, or in the position assumed between glass contact periods.

When the wheel 176 rides from the following edge of the glass sheet, it will resume its position, as shown in Fig. 27, and the arm 184 will permit the switch 195 to open thereby deenergizing the coil 201. The valve 178 will again close due to the weight of the armature 204 on the valve stem 206 and the flow of flux will be halted. Until a subsequent sheet of glass engages and raises the wheel 176, it will be revolved idly by the wheel 185 to distribute the remaining amount of flux evenly into the felt band 179.

If desired, a sight gauge 207 may be connected to the reservoir so that the level of the flux can be ascertained. The top of the reservoir may also be covered by a suitable lid 208 to maintain the contained flux in a clean condition and to permit its occasional replenishment.

From the fluxing unit 175, the glass sheet 20 is carried along by the conveyor H, bringing the conditioned and fluxed portion b of the coating 16 beneath a solder melting pot 209. This solder pot is adapted to dispense solder, in the form of molten drops onto the fluxed coating b at regular spaced intervals, with the drops being of a size and spacing dependent on the fluidity of the solder and the size of the feeding orifice. In actual practice, with a conveyor speed of approximately 20 feet per minute, the drops are placed at a distance of from one half to one inch apart and are of a size that will produce a solder coating of the desired thickness when they are smoothed or ironed over the fluxed metal surface.

For this purpose, the pot 209 from which the solder is fed is supported above the path of travel of the margin b on a standard 210 comprising a column 211 and base 212. The pot casing has boss 213 which is slidably received on the column and secured thereon, in any adjusted position or elevation above the sheet 20, by set screws 214. Any suitable type of commercially procurable melting pot may be used and may be electrically heated, as from a supply line 215, and have an adjustable temperature range controlled by a thermostat, such as shown at 216. The liner pot or crucible 217 of the melting pot is preferably arranged to have an offset extension 218 projecting downward through the lower or bottom wall of the pot casing. In order to facilitate the formation of solder in drops, the end of the extension is tapped to receive a threaded nipple 219 which, due to an internal restriction orifice 220 cooperates with a rod 221 to provide a metering valve through which the liquid solder passes, as shown in Fig. 33. As illustrated therein, the rod 221 has a stem or tapering end extension 222, of small diameter, located in the passageway 223, of the orifice 220 and movable therein to reduce or increase the quantity of solder which can pass therethrough.

The rod 221 is supported so as to provide, not only a means for primary adjustment, but for various alterations and for infrequent opening of the passageway 223 to relieve any small accumulations by flushing. The rod is generally carried on a bridge 224 that is secured to the top rim of the melting pot by the base 225 formed of blocks 226 and a cross plate 227. The cross plate has formed as an integral part thereof a sleeve 228 through which the rod can be moved in substantially vertical directions by a lever bar 229.

The portion of the rod extended through an opening 230 in the bar is preferably threaded, as at 231, and locking nuts 232 are located thereon before the knob 233 is attached to the end of the rod. The nuts serve to determine the extension of the rod into the restriction orifice 220 and the primary adjustment of the stem extension 222 therein. The lowermost of the nuts 232 rests on an enlarged part of the lever bar having an arcuately formed surface 234 on which the nut is supported in a tangential relation. The nut will therefore ride on the arcuate surface as the lever is raised or lowered without binding or creating a frictional condition by that portion of the rod in the sleeve 228. The opening 230 may also be elongated to permit movement of the lever relative to the rod.

The lever is pivotally supported at one end on a pintle 335, the ends of which are carried in a bifurcated block 236 formed at an end of the cross plate 227. The lever is supported at its opposite end by a bolt 237 which rests upon a spring pressed thimble 238. The thimble has a flanged rim 239 located in a chamber 240 formed in the base 225. As may be seen in Fig. 30, before the assembly of the base from the blocks 226 and cross plate 227, one of the blocks is counterbored to form a recess 241 which matches a counterbored hole 242 produced in the plate. The thimble is then inserted into the hole 242, its flanged rim 239 nesting in the counterbore. A spring 243 is then placed in the recess 241 so as to enter the thimble when the block 226 is properly located with respect to the plate 227. As shown in the figure, during normal operation, the spring, though compressed, can exert no force on the thimble since the rim 239 is nested in the counterbored portion of the hole 242.

The bolt 237 accordingly rests upon the thimble and will raise or lower the lever as it is threaded in or outwardly therefrom. If desired, a ring nut 244 is carried by the bolt to lock it in any position to which it has been turned to make various adjustments of position of the rod 221 through the lever 229.

Between the outer end of the lever 229 and the bolt 237, a threaded rod 245 is located in an opening 246 formed in the lever. The rod is secured by any suitable means in the cross plate 227 and has threaded thereon a ring nut 247 above the lever. Secured to the end of the rod is a small bar 248. Referring again particularly to Fig. 30, it will be seen that the ring nut 247, in the position shown, will have no effect upon the pivotal movements of the lever 229; however, if the ring nut 247 is threaded downward onto the lever and further downward, its action will sufficiently overcome the spring 243 and cause the lever to lower the rod 221 until the stem 222 closes the orifice 220 thereby stopping the flow of solder. Release by the ring nut 247 will again allow the stem to open the orifice for resumption of the solder flow.

Should the ring nut 247 remain in the position shown and disengaged from the lever, the lever can be operated in a reverse direction to remove the restriction of the passageway 223 momentarily to increase the solder flow and flush the area of any quantity of solder or foreign matter which prevents a steady flow. By gripping the ends of the lever 229 and bar 248 in a squeezing action, an operator can endeavor to correct any temporary faulty flow without shutting down the entire machine. It has also been found possible to produce the same action by lifting the rod individually by the knob 233. To prevent inadvertent removal of the rod, a lock collar 249 may be secured on the rod and sufficiently beneath the lever to permit a slight movement of the rod.

In order to catch the solder drops that fall between succeeding sheets of glass, and to prevent the accumulation of solder on the surface 112 of the frame 113, the surface plate 112 is recessed, as at 250, and a gathering spout 251 is mounted on the frame to receive the solder drops and direct them into a suitable container. Preferably, a low melting point solder is utilized in the pot 209 since it has been found that the use of ordinary solders results in relatively high working temperatures with soldering irons whereby undesirable strains are set up between the metallized coat and the glass. The low melting point solders that we use have been found to have a wider plastic range of melting and to permit working within a reduced temperature range so that, for our intended purpose, and during the subsequent assembly of the glass with a separator strip 13, a more plastic range of solidifying points may be procured.

Of the many variations of soft solders which can be obtained, a satisfactory composition for excellent working purposes has been found to consist of approximately 30 parts of tin, 50 parts of lead, and 20 parts of bismuth. With this type of solder, we have found a suitable working temperature to be around 625 degrees Fahrenheit.

The sheet 20, after having passed beneath the solder pot 209, and having received solder in drop formations, is moved to continuously pass the solder drops on the metal coating beneath a pair of irons 252 arranged in tandem, which reheat the solder to flowing condition and smooth or iron it into an even uniform coating of the desired thickness on the metallized margin of the glass.

Figure 35:
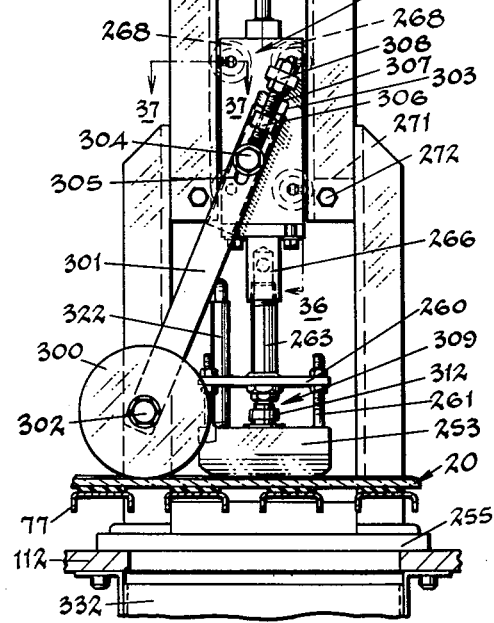
Fig. 35 is a front elevational view of one of the solder ironing or spreading devices.
Figure 36:
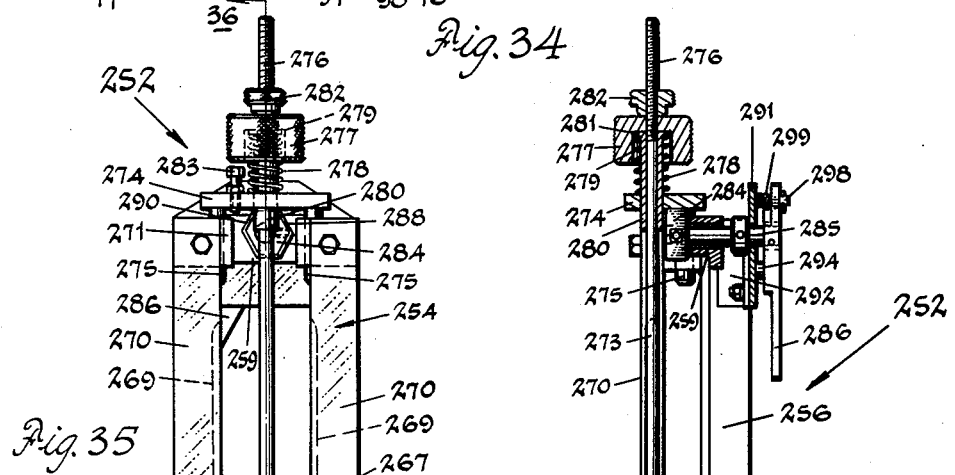
Fig. 36 is a view of a section taken on the line 36—36 indicated in Fig. 35 and illustrates the means for adjusting the weight of the iron or spreading tool.

Each of these solder working irons, which have been generally designated by the numeral 252, comprises an ironing body 253, a supporting framework 254 and suitable controlling members. As illustrated in Figs. 35 and 36, the supporting frame 254 of each iron 252 comprises a base plate 255 carried by the plate 112 of the auxiliary frame 113, and angle iron standards 256, the standards being suitably welded to the base plate and reinforced in such relation by gussets 257. The standards are also interconnected by bars 258 and 259 that are desirably located along their length.

The ironing body 253 is supported for vertical and also for tilting movement upon the frame 254 to give it a flexible floating action. To accomplish this, the ironing body is hung from a plate 260 by a threaded rod 261 attached at the opposite end along the sides thereof.

The plate 260 may be formed as a welded part of a tubular member 263 and the rods 261 and 262 extend through registering holes 264 in the plate 260 to form a sort of tripod arrangement and are adjustably held by nuts 265 engaging the plate on each surface.

By proper adjustment of the nuts 265, the ironing body 253 can be tiltably adjusted to locate its lower or ironing surface in the plane of the surface of the glass sheet being tinned and insure the production of a finished solder coating of the required uniform thickness.

The tubular element or pipe 263 is threaded at its upper end into a block 266 which is bolted to a slide member 267. The slide member has ball bearing rollers 268 that travel in ways 269 formed in rails 270. The rails 270 are spaced outwardly from the standards 256 of the frame 254 by blocks 271 and are secured thereon as by the bolts 272. The slide member is generally suspended between the rails by a rod 273 which is extended through a plate 274 that is supported by pins 275 in the upper part of the blocks 271. The rod has a threaded end portion 276 on which a weight 277 is located to urge the rod and slide member downward except as influenced by a spring 278. The weight is formed to provide a counterbore 279 (Fig. 36) for receiving the spring and also a sleeve 280 having a flange 281 against which one end of the spring bears. The opposite end of the spring is carried by the plate 274 and, as shown in the figure, the rod moves through the sleeve while the major load of the slide member will be absorbed by the spring.

The downward urgence of the member 267 by the weight 277 will thus be offset by the spring 278 although the compression developed therein may be modified by movement of the weight along the threaded portion 276 of the rod, after which a lock nut 282 may be turned against the weight to maintain any adjustments made. Since the relative movement of the various parts may be accordingly determined, the effectiveness of the weight to urge the shaft downward will be balanced by the spring whose expanding characteristics are restricted by the position of the weight on the rod.

The plate 274, upon which the end of the spring 278 is carried, is provided with a stop bolt 283 for arresting downward movement of the rod 273 by engagement with the weight 277. Means is also provided for retaining the adjustment effected between the weight and the spring while adjusting the elevation of the iron to accommodate thicker or thinner sheets of glass such as that commercially manufactured in thicknesses of ⅛, 3/16 or ¼ of an inch. As shown in the drawings, particularly Figs. 36, 37 and 38, a preferred construction comprises a cam 284, a shaft 285 and an actuating lever 286. The shaft is mounted in a journal 287 located in the cross bar 259 which forms a part of the frame 254, the cam 284 being carried by the shaft so that the surfaces 288, 289 and 290 formed thereon will raise or lower the plate 274, the pins 275 moving in the blocks 271 to assure substantially vertical movement. The relation of the cam surfaces is varied, with reference to the plate 274, upon rotation of the shaft and according to the position of the lever 286. As shown in Fig. 37, a mounting plate 291 is attached to the standards 256 by supporting angles 292 and has a series of radially spaced openings 293, the distance between each opening being equal to the corresponding angular relation of the surfaces 288, 289 and 290 of the cam. Thus, rotation of the lever to the left from the position as shown will cause a descent of the iron as the plate 274 is supported on the cam surface 288, while movement of the lever to the right will raise the iron, by the cam surface 290, to permit quarter inch glass to move adequately therebeneath. The lever 286 has a stud 294 which may be inserted in any of the openings 293 according to the desired height of the iron as produced by support of the plate 274 on one of the cam surfaces. Having moved the lever to obtain the desired cam surface, the stud enters the registering opening 293 upon inward pressure of the lever. If desired, suitable legends may be provided adjacent the openings to facilitate ajustment of the iron to the desired height.

In order to permit easy removal and insertion of the stud and at the same time, to afford a resilient locking means therefor, the lever 286 is pivotally mounted on the shaft 285 by a pin 295, as shown in Fig. 38, which extends through the walls of a slot 296 formed in the lever, the walls interfitting with the flat surfaces 297 formed on the end of the shaft. A spring pressed stud 298 is mounted in the end of the lever opposite the stud 294 so as to bear against the plate 291 and acts to swing the lever about the pin 295 to retain the stud 294 in the selected opening 293. When the lever is to be rotated, it is moved to the position shown in phantom lines, to collapse the spring 299 on the stud 298 and permit withdrawal of the stud 294.

Through the interrelation of the above described parts, elevation of the soldering iron may thus be adjusted to obtain the most satisfactory smoothing of the solder drops into a solder coating of desired thickness and also vary the elevation to accommodate different thicknesses of glass. However, the iron must also be automatically controlled so that the afforded downward pressure will not be exerted to cause collision of the iron with an approaching sheet of glass. The iron is therefore lifted over the edge of the glass sheet by a wheel 300. The wheel is carried by the slide member 267 in a position which is ahead of the iron by a diagonally extended bar 301 on which the wheel is rotatably supported by a shoulder bolt 302. The bar is slidably mounted in a guideway 303 formed in the face of the slide member and retained therein by a bolt 304 which extends through a slot 305 in the bar. In order to vary the elevation of the wheel with reference to the iron, the bar 301 has a threaded block 306 for receiving a set screw 307 which is mounted in a block 308 secured to the slide member.

As the sheets of glass approach the vicinity of the iron units, generally indicated at 252, the wheel 300 will ride onto and over the leading edge and will raise either of the irons 253 into the desired elevation with reference to the metal coating 16. The solder drops which have been deposited thereon will then be influenced by the heat of the iron and as they again become fluid will be spread and smoothed over the alloy coating 16 on the glass sheet 20.

The heating element 309 for the iron body is located within the tubular element 263 and partakes of a conventional arrangement for the combustion of a gas mixture. As shown in Fig. 40 of the drawings, the lower end part of the tubular element 263 has a pipe fitting 310 into which a burner element 311 is threaded. The burner element has a body portion 312 in which a ceramic disk 313 is located and secured by a threaded sleeve 314. The disk is provided with conventionally arranged perforations 315 through which the gaseous mixture passes before igniting within the sleeve 314. The sleeve extends into the body of the iron, a bore 316 being formed therein so that the thermal effects of the combustion will be absorbed by the iron body. Suitable communicating passageways 317 extend from the bore to the atmosphere for exhaust of the burned gases.

The combustible gases are fed into the heater elements 309 of each iron unit 252 from a conduit 318 which is connected to the block 266 that is drilled to provide a communicating passageway 319 between the conduit and the threaded end of the tubular element or pipe 263. The conduit 318 is connected to the source of supply 129 through thermostatically controlled valves 320, a general arrangement of which may be seen in Fig. 43. The valves 320 are encased in a panel box 321 and supply the conduits 318 according to the valve adjustments produced manually or by variations in the heat ranges received from the influential temperature of thermocouple 322 through the connecting pipe 323. The panel box 321 is preferably of a conventional type, having a windowed aperture through which the customary indicator dials may be observed. The case of the thermocouple is threaded into the body portion of each iron, as shown in Fig. 40, so as to be intimately responsive to temperature conditions within the iron body.

Each iron is individually controlled by its respective valve 320 to maintain a temperature variance of plus or minus 20 degrees Fahrenheit from the predetermined heat range. Preferably variations are also established for the effective heat ranges of the irons of each pair, a difference of approximately 50 degrees Fahrenheit being found desirable since the second iron is working solder of substantially a molten consistency. Such variations afforded for the iron temperatures are also modified in a like manner for glass of various thickness, a range of approximately 50 degrees Fahrenheit having been found desirable between one-eighth and one-quarter inch glass. Thus, and by way of example, when processing glass sheets of one-eighth inch thickness, the heat range of the first iron might be within a plus or minus 20 degrees Fahrenheit differential of 550 degrees Fahrenheit, while the second iron, having a similar differential of 40 degrees Fahrenheit would have a heat range of substantially 500 degrees Fahrenheit. In progressively equal increases of temperature and for each one-sixteenth of an inch increase in thickness, the temperature of the irons may be increased substantially 25 degrees Fahrenheit.

All of the ironing bodies 253 of the ironing units 252 disposed throughout the line, are substantially identical in structure, except that so-called right hand irons are used on one side of the line and left hand irons on the other. The only difference between these two types of ironing bodies is that they have lower ironing faces that are reversed. A right hand iron is shown in Fig. 41 and a left hand one in Fig. 42.

As shown there, the body portion 253 of both types of iron have a general shape approximating that of a rectangular parallelepiped, but are chamfered as at 324 to provide a lower ironing face 325 having a surface expanse that will be suitable for spreading the solder uniformly over the metallized coating 16 between the edge of the glass sheet and the inner edge of the coating. Thus, the lower ironing face 325 is of less width than the body portion 253 but extends along substantially its entire length. Further, this ironing face 325 is of substantially equal width over the area extending from its leading end to substantially the middle thereof, but is of lesser width at its rear than at its leading end. This results from the fact that the side of the ironing face that faces toward the outside of the tinning line, when in use, is bounded by a substantially straight line 326, while the side of the ironing face that faces toward the inside of the line is substantially straight from the leading end to the middle of the ironing body but curves inwardly from the middle toward the rear end of the ironing face as shown at 327.

This curved edge leading into the chamfered portion 324 acts to relieve the surface area of the face so that, when the iron crosses a previously tinned surface at the corners of the sheet, it will carry any surplus solder in a cross-sweeping effect back into the fresh solder coating that is being applied.

In order to engage the drops of solder on the metallized glass margin and spread it into a uniform coating under the influence of the heated iron (Fig. 40), the lower ironing face 325 of the ironing body 253 is curved upwardly at its leading end, as shown at 328. The rear end of the ironing face 325 is also curved upwardly as at 329, but this is a shorter curve and of less radius than at the leading end.

A solder receiving groove 330 is formed in the surface 325 and acts to urge the surplus solder along from one area to another and assure a uniform thickness of coating. The groove 330 partakes of a wide arc, and induces a cross working or sweeping effect of the solder being spread by the ironing body. To assist in distributing the solder and spreading it into a uniform coating, channels are provided in the ironing face 325 and lead from the groove 330 to the opposite edges of the ironing face. It will be noted that there is one of these grooves, designated 331, leading toward the edge of the iron that is toward the inside of the tinning line and two, designated 331' leading toward the edge that is toward the outside of the line. These latter two grooves also act to carry surplus solder outwardly beyond the edge of the metallized margin and off of the glass sheet. The excess or salvage solder is caught in funnel-shaped receptacles 332 that are attached to the frame 113 at points beneath either of the irons.

As indicated above, the first ironing body of each pair of ironing units 252, which are arranged in tandem, acts to spread and iron out the drops of solder deposited on the metallized coating 16. The second iron, on the other hand, acts to reheat and rework the spread layer of solder to remove pin holes and other minute defects which may exist. In other words, the second iron assures the smoothing of the solder layer into the final coating which will be thoroughly bonded to the metallized surface 16.

Figure 26:
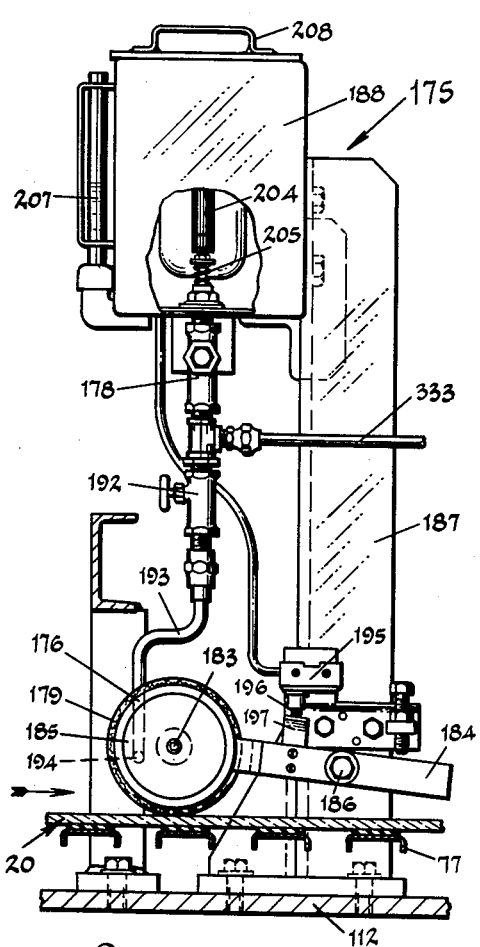
Fig. 26 is a front elevational view of the flux dispensing unit, showing the flux applying wheel in contact with the glass sheet.

In order to minimize possible corrosion of the second iron, and oxidation of the soldered surface after it leaves the first iron, a small quantity of flux is deposited on the solder coating between the first and second irons. This can be done by means of a tube 333, connected to the flux distributing unit 175 at a point below the valve 178 (Figs. 26, 27 and 43). The amount of flux dispensed at this point is quite small and may be controlled in relation to the speed of travel of the glass by a visible drop regulator 334 interposed in the length of the tubing 333.

One form of ironing body 335 which we have successfully used as the left hand iron and as the second iron is illustrated in Fig. 42 and is essentially a duplicate of the ironing body 253 shown in Fig. 41, except that it is reversed for the opposite hand. Still another form of ironing body, which can be used as either a first or second iron, and is really the preferred form, is illustrated at 336 in Fig. 46. The ironing body 336 closely resembles ironing bodies 253 and 335 except that (1) the lower surface 325 thereof is provided with two curved grooves 330 instead of one; (2) the two straight grooves 331' lead from both of the curved grooves to the edge 326 while the single groove 331 that leads to the opposite edge from the adjacent curved groove is substantially parallel with the grooves 331' instead of being at an angle thereto; and (3) the grooves 330 are open as shown at 330' at the leading end of the iron. The advantage of this arrangement is that it gives better solder coverage, more thoroughly works the solder across the area to be tinned, and makes it possible to use higher line speeds.

However, regardless of the specific form of the ironing body, the lower surface 325 thereof is formed in a manner calculated to reduce the tendency of the solder to create ridges as it is spread or ironed out. Such ridges or irregularities are ordinarily particularly pronounced at the corners of the sheet 20 where the iron crosses previously produced solder coatings. For example, when tinning the long metallized margins c and d of the sheet with the sets of tinning units W and X, while the glass sheet is on the conveyors L and P, and after the two short margins a and b have already been tinned by the sets of units U and V while on the conveyors D and H respectively.

At this area of overlap at the corners, and which is best shown in Fig. 47, the solder is normally urged outwardly from beneath the ironing body and tends to accumulate as a ridge at 337 along the edge of the newly tinned surface 338. In order to overcome this condition, the ironing bodies 253, 335 and/or 336 are provided with the arcuately sloped surface 327 to relieve the surface area where the ironing body crosses previously tinned surfaces, and to carry the solder being ironed in a cross-sweeping effect back into the solder coat being produced.

Or, somewhat differently expressed, the molten solder will be worked equally and fully across the copper coating 16 between the leading and following edges of the sheet 20. However, as the following edge moves beneath the soldering iron, the narrowing area 327 of the working face of the iron urges the molten solder outwardly at the corner of the sheet and away from previously tinned surfaces. This operates to reduce any increase in thickness of the solder coating where one such coating crosses and substantially overlays another such coating.

To induce the flow of solder as desired, the grooves 331 and 331' act as tributaries through which the solder will be carried away from the main groove or grooves 330 and discharged from the edge of the glass. The salvage solder is caught in the funnel-shaped receptacle 332 that is attached to the frame 113 (Fig. 35) and is collected at intervals for reprocessing.

When the glass sheet 20 passes from the timing conveyor H, over the intermediate conveyor I and onto the aligning conveyor J, it has had the two short metallized margins a and b tinned, and is ready to be tinned along one long margin c. To accomplish this, it is necessary that the advancing sheet 20 be turned 90° on the conveyor J before the margin c can be properly aligned by the aligning unit S for passage beneath the set of tinning units W on the conveyor L.

In turning the sheet 20 through 90° to properly position it on the aligning conveyor J, it is essential that the sheet be turned without losing its proper spacing on the line with relation to the preceding and succeeding sheets being processed. Obviously, this can be done by an operator lifting the sheet manually and turning and positioning it in the desired location. However, we prefer to use an automatic type of lifting and turning mechanism which can be set up to operate at predetermined intervals in timed relation to the speed of the tinning line. A more or less conventional type of mechanism suitable for this purpose has been illustrated in Figs. 6 and 7.

As shown there, there is provided a turning device indicated generally by the numeral 340, and which comprises a carriage 341, a carriage supporting structure 342 and a lifting and turning frame 343. The frame 343 is provided with conventional type vacuum cups 344. In operation, as the sheet 20 arrives at a position directly beneath the device 340, the frame 343 is lowered by means of a hydraulic cylinder 345 until the cups 344 engage the glass sheet. Suction is then applied and the frame 343 with the glass sheet secured thereto is raised by the hydraulic cylinder 345 to lift the sheet from the conveyor surface. With the sheet lifted, the frame 343 is turned to a position at right angles to its former one by a rack and pinion assembly in the case 346 which is operated from an air cylinder 347. The frame 343 is then lowered by the hydraulic cylinder 345 to return the turned sheet 20 to the conveyor, whereupon the vacuum is released and the frame 343 retracted.

To permit the sheet 20 to be turned and then replaced in the same position which it previously occupied on the conveyor with relation to the preceding and succeeding sheets on the line, the carriage 341 is provided with wheels 348 which traverse rails 349 carried by the supporting structure 342. By means of the pinion 350, keyed to the axle 351 of the rear pair of wheels 348, for engagement with a rack 352 on the mounting structure, and driven from the motor 353, it will be possible to move the glass lifting and turning mechanism 340 at the same speed as the conveyor J during the lifting and turning operation.

By the use of suitable limit switches, the lifting and turning device just described can be made completely automatic, and the necessity for an operator at this point entirely eliminated.

Figure 44:
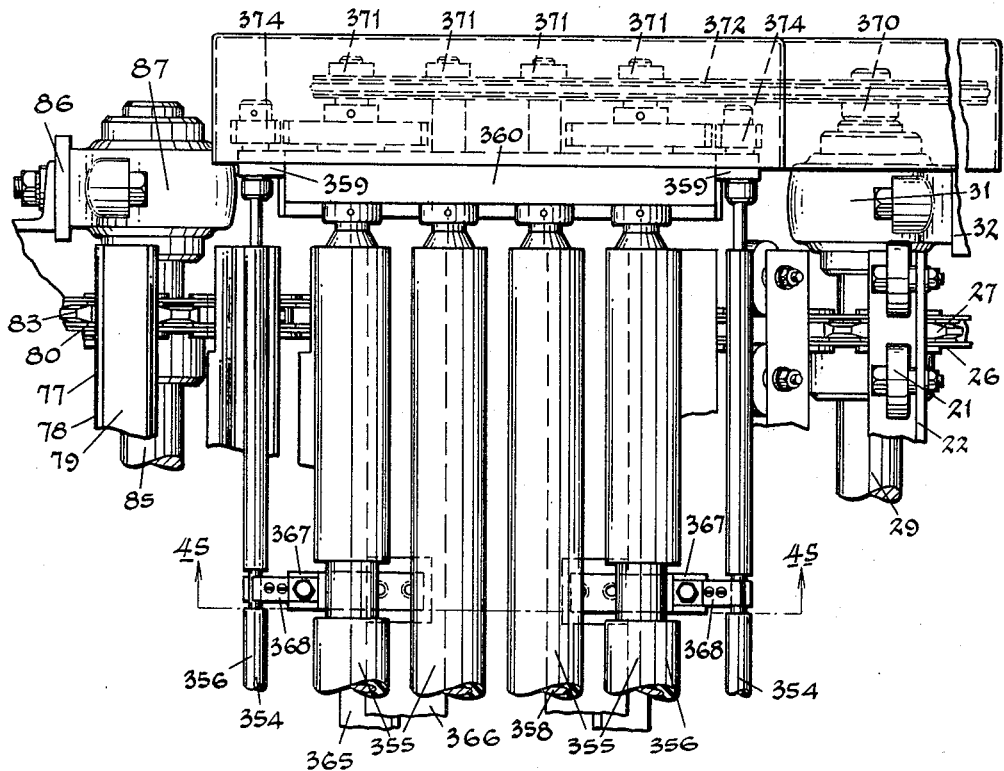
Fig. 44 is a top view, in part, of one of the intermediate conveyors.
Figure 45:
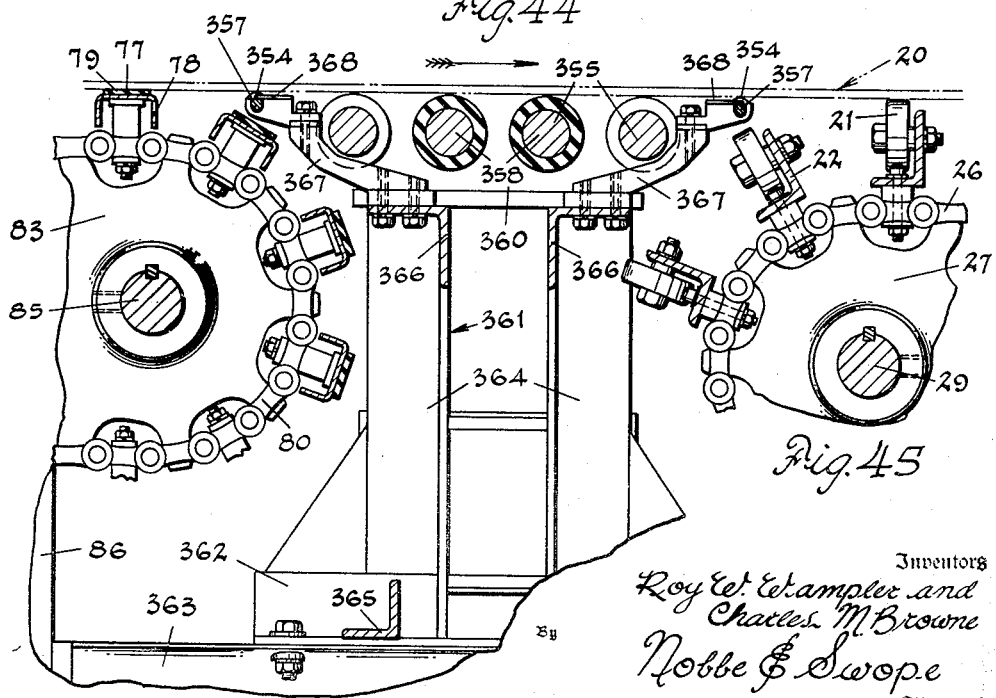
Fig. 45 is a section taken substantially on the line 45—45 as indicated in Fig. 44.

As described above, the glass sheets 20, during passage over the tinning line A, pass from the aligning conveyors B, F, J and N onto the next succeeding tinning conveyors D, H, L and P on intermediate conveyors C, E, G, I, K, M, and O. Each of these intermediate conveyors, as best shown in Figs. 43, 44 and 45, comprises a series of rolls 354 and 355. The rolls are provided with resilient surfaces afforded by rubber sleeves 356 that are vulcanized to core shafts 357 and 358, respectively. The outer rolls 354 are considerably smaller in diameter than the rolls 355 to permit their location, as near as possible, to the support members of the various units.

The core shafts 357 and 358 of the outer rolls 354 and inner rolls 355 are mounted at their ends in journal blocks 359 and 360, respectively, that are secured to the frame 361 of the intermediate conveyor units. The lower end plates 362 of the frame are carried by channels 363 which extend between and are secured to the end columns of the aligning and tinning units throughout the entirety of the apparatus A. The end plates 362 have standards 364 and are interconnected by angles 365 at the lower portions and angles 366 that extend crosswise between the standards 364. Due to the reduced size of the rolls 354, the core shafts 357 thereof are supported by brackets 367 which are disposed along the angles 366 between the standards 364. In order to afford bearing portions, the shafts are exposed in the vicinity of the brackets 367 and the rubber sleeves terminated on either side thereof.

The shafts may be retained in the brackets by clips 368. Also, to accommodate the positioning of the brackets 367, the rubber sleeves of the adjacently located rolls 355 may be removed, as shown in Fig. 44.

The rolls 354 and 355 are driven by a suitable gearing 369 which is located at an end of the frame 361. For convenience and to prevent conflict with the moving glass sheet, the gearing is mounted on the frame at the side of the proximate units along which the edge of the sheet, to be aligned and solder coated, is located. As shown in Fig. 43, the gearing comprises a main sprocket 370, mounted on the shaft 29 of the aligning conveyor J, and a plurality of sprockets 371 keyed to an end of the shafts 358 of the rolls 355. The gears are driven by a belt chain 372. The rolls 354 are driven through a gear train from adjacent shafts 358 on which spur gears 373 are mounted. Each gear 373 drives a pinion 374 on the shaft 357 of the roll 354 through an idler pinion 375 to maintain the general direction of rotation. The multiple of the gearing train thus provided is such that the rolls 354 and 355 revolve at a comparable speed to the movement of the glass sheet as it leaves the surface of the aligning conveyor and as it is picked up and carried by the surface of the tinning conveyor.

In order to drive the aligning, intermediate and tinning conveyors in synchronism, a jack shaft 376 is disposed along the tinning line A so that the power take-off for each adjacent pair of aligning and tinning conveyors will be located along the side of the respective conveyor frames opposite the aligning unit and set of tinning units associated with these conveyors.

Thus, as shown in Figs. 4 and 5, the power source, or motor, 94 is located to one side, and substantially midway, of the third tinning conveyor L. The motor 94 drives a primary speed reduction unit 377 through the chain belt 378. The speed reducing unit 377 is connected to the shaft 376 by suitable universal joints 379 and 380. The centrally disposed portion 381 of the shaft 376 is journaled in floor mounted bearings 382 and extends from the universal joint 379 to a reducer unit 383 which supplies power to the second aligning conveyor F and the second tinning conveyor H. From the reducer unit 383, the shaft portion 384 of the jack shaft 376 extends along the unit H and is mounted in bearings 385. The shaft portion 384 is connected by universal joints 386 to shafting 387 which is extended diagonally through the frame of the aligning unit F to a similar joint connection 388 positioned on the opposite side of the apparatus A. The joint connection 388 is coupled to the speed reduction unit 389 by a shaft 390 for operating the first aligning conveyor B and the first tinning conveyor D.

The shaft portion 391, from the universal connection 380, connects the primary reducer unit 377 to a reducer unit 392 for operating the third aligning conveyor J and the third tinning conveyor C. Through the reducer unit 392, the jack shaft 376 is generally projected by means of universal joints 393 and 394 and the shafts 395 and 396 to the reducer unit 397 for operating the fourth or last aligning conveyor N and the fourth or last tinning conveyor P. The shaft 376 is thus extended by the joints 393 and the shaft portion 395 that extends, diagonally, through the frame of the aligning conveyor N, to the end shaft 396 by the joint 394. The shafts 387 and 396 and the reducer units 389 and 397 are thus positioned on the opposite side of the machine assembly from the units 383 and 392, and are suitably located so that their belt drives will not interfere with other functioning portions of the machine units.

The means for driving the adjacent pair of aligning and tinning conveyors F and H from their respective speed reducing unit 383 is best shown in Figs. 6, 7 and 43, and this typical mode of coupling the power is duplicated for each adjacent pair of aligning and tinning conveyors throughout the machine. Specifically, as shown in these three figures, the driven shaft 398 of the speed reducer 383 is connected to the shaft 85 by suitable gearing and a chain belt 399. Through the roller chain belts 80, the sprocket gears 83 on the shaft 85 rotatably drive the sprocket gears 82 and the shaft 84 to which they are keyed. The shaft 84, in turn, drives the shaft 30 of the aligning conveyor F by means of the gears 400 and chain belt 401. As noted above, the other adjacent pairs of aligning and tinning conveyors are connected to their respective speed reducers in the same manner; and, as explained above, each of the intermediate conveyors is driven from the end of the adjacent aligning conveyor.

The complete operation of the tinning line of this invention in successively tinning each of the four marginal portions of a glass sheet has been set forth generally at the beginning of the specification, and the complete operation of one set of tinning units, which is typical of each of the four sets on the line, has been explained in detail. But a better understanding of just what happens to a glass sheet as it is passed beneath one of the tinning units can be had by referring to Fig. 3 of the drawings.

The sheet 20, illustrated in this fragmentary perspective view has been previously metallized so that its marginal edges are coated with metal as shown at 16. As the sheet 20 moves, in the direction of the arrow, beneath a set of tinning units, the margin e will first be reduced, burnished and fluxed to give a fluxed metallized surface as indicated at f. Proceeding further, the fluxed surface will receive drops of solder from the solder depositing unit as shown at g. The fluxed surface carrying the solder drops will then pass beneath the ironing units to produce the finished layer of solder indicated at h, which is in intimate contact with the metal layer therebeneath and is of uniform thickness, density and surface expanse.

There is illustrated in Figs. 48 and 50 of the drawings a somewhat modified form of burnishing or abrading unit which we have used with remarkable success in lieu of the unit shown in detail in Figs. 19 to 23. This unit, which has been found to give longer and more even wear, and to reduce objectionable scratching of the metallized coating and the glass, is designated in its entirety by the numeral 402 and comprises generally a frame 403, a brush counter-balancing support 404 and a motor 405 on frame 403 for driving a wire brush 406.

More particularly, the frame 403 comprises a horizontally disposed plate 407 which has a downwardly directed flange 408 connected by bolts 409 to the side members 88 of the frame 86. Centrally on the underside of plate 407, a hollow boss 410 is formed to receive the upper end of a column 411 which by its base 412 supports the unit 402 bodily from the floor. On the upper surface of the plate 407 there is a vertically disposed bracket 413 having horizontally extending, journaled bosses 414 for receiving the shafts 415 by which the support 404 is carried on the frame 403.

The brush counter-balancing support 404 is constructed substantially in the form of a parallelogram in that upper and lower links 416 and 417, carried at one of their ends on shafts 415 are parallel in a horizontal plane and support in their opposite ends horizontally disposed shafts 418 so that the axes of shafts 418 are substantially parallel to shafts 415 and said shafts will be movable through a vertical plane parallel to a plane through the axes of the shafts 415. The link 416 is formed to have a depending lug 419 carrying an adjustable set-screw 420 while the link 417 has a corresponding, vertically disposed lug 421 carrying a similar set-screw 422. The set-screws are adapted to limit the upward or downward motion of the links 416 and 417 by engagement with an abutment 423 of the bracket 413.

The shafts 418 in the opposite ends of links 416 and 417 support an especially formed bracket 424 which carries support wheels 425 and 426 and the adjustable support means 427 for the wire brush 406. The wheels 425 and 426 are disposed between vertical flanges 428 and 429 in which their shafts 430 and 431 are journaled. The shaft for the brush 406 (not shown) is journaled in a vertically movable block 432. The block 432 is supported for vertical sliding adjustments on and relative to the bracket 424 and is positioned therein at a general angle of 45° to the shafts 418. The block is thus adapted to position the brush 406 in such angular relation to the sheet 20, moving therebeneath, that the entire periphery thereof acts upon the copper coating in a manner that the removed material will be directed outwardly and off the sheet.

The block 432 constitutes the movable member of the adjustable support means 427. Such means, as herein shown, includes a vertical threaded rod 433 located in the bracket 424 and having a handled end 434. If desired, a calibrated collar 435 may be mounted on the rod to indicate the extent to which the rod is turned, or, more particularly, the extent of vertical movement imparted to the block 432. Thus upon turning the rod 433, the block 432 will be caused to raise or lower the wire brush 406 relative to the bracket 424 but more especially advance or retract the bristle periphery from the copper coating 16 on the sheet 20 as determined by the wheels 425 and 426 that are supported on the surface thereof, as may be seen in Fig. 49. In other words, the general elevation of the bracket 424 is determined by the wheels 425 and 426 and consequently, in shifting the block 432 relative to the bracket, the brush 406 will be brought toward and against or away from the surface of the coating.

The shaft of the brush carries a pulley 436 which is driven from the pulley 437 of the motor 405 by a belt 438 trained thereabout. The motor 405 is mounted on the plate 407 and suitably bolted thereto. If desired, a protecting shield 439, as indicated by broken line in Fig. 50, may be located about the pulleys 436 and 437 and so as to enclose the wire brush 406.

In order to counter-balance the combined weights of the links 416 and 417 and the bracket 424 on which the wheels 425 and 426 and brush shaft supporting means 427 are carried, a weight 440 is supported on a rod 441 securely carried in brackets 442 on the link 416. The weight 440 can be releaseably secured in any adjusted position on rod 441 by the set-screw 443. The weight 440 affords a balancing medium on one side of the shafts 415 for the weight of the elements disposed on the other side and thus a "floating" balance is effected whereby no load is enforced upon the glass and at the same time the wheels 425 and 426 will generally carry the brush 406 in its desired relation to the copper coating on the sheet 20.

As the sheets 20 progressively are carried between the burnishing unit 402, they may be spaced apart according to their initial placement or entry into one or the other of the units, indicated at U, V, W and X. Since the wheels 425 and 426 are adapted to be supported on the surface of the sheet 20 they are as well supported on the rubber surfaces 79 of the channels 78 which make up the conveyor belt 77. And since the wheels 425 and 426 determine the height of the wire brush 406 at the surface of the copper coating, the wire brush will be sustained above the glass supporting surfaces 79. In any event, the extent of descent of wheels 425 and 426, as they ride off from the end of one sheet, will be determined by the set-screw 420 which is then carried into engagement with the abutment 423. Preferably, however, the set-screw 420 limits the downward movement of the bracket 424 generally so that the wheels 425 and 426 will at all times be positioned slightly above the surface of the conveyor 77. On the other hand, by means of the set-screw 422, the raising of the wheels 425 and 426 from the glass surface may be prevented in the event that the weight 440 should be accidentally shifted along the rod 441.

In operation, when the leading edge of a sheet 20 approaches a burnishing unit 402, the wheel 425 rides onto the surface thereof and causes the counter-balancing support 404 to move upwardly to establish a balanced position between the bracket 424 and the weight 440. The wire brush 406 is now lifted or positioned to engage the copper coating 16 on said glass sheet and causes a burnishing of the surface. As the following end of the sheet 20 moves from beneath the wheel 425, the wheel 426, still on the sheet, will support the brush until it is beyond the following edge of the sheet at which time the component parts of the support 404 will be permitted to move downwardly in their parallelogram relation as the wheel 426 rides off from the sheet and until stopped by engagement of the set-screw 420 with the abutment 423.

In addition to the features of longer and more even brush wear already mentioned, and which result primarily from the angular relation of the brush to the metallized coating, the unit just described also gives a better, more accurately controlled, and more efficient burnishing operating.

Thus, the special mounting means makes it possible to burnish with a light flicking or brushing action, to remove the remaining oxides in the coating, using the same pressure at all times regardless of the thickness of sheet being treated.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:
1. In apparatus for tinning a metal surface including a tinning line having means for conveying said surface along a predetermined path and tinning means arranged above the path of travel of said surface, means for applying flux to said surface, said flux applying means comprising a shaft, a flanged wheel keyed to said shaft, said wheel having openings through said flange and being positioned to continuously engage the surface to be tinned throughout its length, a pad of absorbent material on the periphery of said wheel, means for feeding flux to the inside surface of said flange, and a second wheel of smaller diameter than said flanged wheel and keyed to the same shaft for engagement with the conveying means when the flanged wheel is out of engagement with the surface to be tinned for rotating said flanged wheel.

2. In apparatus for tinning a metal surface, a tinning line including means for conveying said surface along a predetermined path, and conditioning and tinning means arranged along and above the path of travel of said surface and including in sequence means for applying flux to said surface, means for depositing a mass of solder on said surface, a pair of ironing bodies arranged in tandem and positioned for ironing engagement with said surface for first spreading the massed solder into an even uniform coating and then removing defects from said coating, means for heating said irons, and means for tilting the irons relative to said surface while adjacent thereto and for adjusting them vertically toward and away from said surface.

3. In apparatus for tinning a metal surface in a single continuous operation, an ironing member having a body portion, a generally flat lower ironing face having upwardly curving leading and rear ends and being of lesser width at its rear than at its leading end on said body portion, a curved solder receiving and spreading groove in and extending longitudinally of said ironing face, and channels in said face leading from said groove to the side edge of the ironing face.

4. In apparatus for tinning a metallized glass surface including means for conveying said surface along a predetermined path and tinning means arranged along and above the path of travel of said surface, a rotatable wire brush having its axis of rotation arranged at an angle to the path of travel of said surface and mounted for movement toward and away from said surface, means for limiting the movement of said axis toward said surface, and means for rotating said brush relative to said surface while in contact therewith for burnishing the same.

5. In apparatus for tinning the metallized margin of a glass sheet in a single continuous operation, an ironing member having a body portion, a generally flat lower ironing face provided with upwardly curving leading and rear ends and being of lesser width at its rear than at its leading end on said body portion, a plurality of curved solder receiving and spreading grooves in and extending longitudinally of said ironing face, and parallel angularly arranged channels in said face leading from said grooves to the side edge of the ironing face, and means for heating said ironing member.

References Cited in the file of this patent

UNITED STATES PATENTS

| | | |
|---|---|---|
| Re. 14,345 | Stuebing | Aug. 21, 1917 |
| 246,820 | Robbins | Sept. 6, 1881 |
| 1,827,667 | Mowrey | Oct. 13, 1931 |
| 2,225,778 | Hallman | Dec. 24, 1940 |
| 2,233,622 | Lytle | Mar. 4, 1941 |
| 2,293,822 | Haven | Aug. 25, 1942 |
| 2,369,350 | Haven | Feb. 13, 1945 |
| 2,407,208 | Sherwood | Sept. 3, 1946 |

UNITED STATES PATENT OFFICE

CERTIFICATE OF CORRECTION

Patent No. 2,938,494

May 31, 1960

Roy W. Wampler et al.

It is hereby certified that error appears in the printed specification of the above numbered patent requiring correction and that the said Letters Patent should read as corrected below.

Column 8, line 61, for "from" read -- form --; line 74, for "be" read -- but --; column 12, line 52, for "335" read -- 235 --; column 18, line 22, for "timing" read -- tinning --.

Signed and sealed this 15th day of November 1960.

(SEAL)
Attest:

KARL H. AXLINE
Attesting Officer

ROBERT C. WATSON
Commissioner of Patents